(12) United States Patent
Zipprich

(10) Patent No.: US 12,521,212 B2
(45) Date of Patent: Jan. 13, 2026

(54) DENTAL PROSTHESIS SYSTEM AND PROSTHETIC STRUCTURE FOR USE WITH A DENTAL IMPLANT INSERTED INTO THE JAW BONE OF A PATIENT

(71) Applicant: Holger Zipprich, Malchen (DE)

(72) Inventor: Holger Zipprich, Malchen (DE)

( * ) Notice: Subject to any disclaimer, the term of this patent is extended or adjusted under 35 U.S.C. 154(b) by 993 days.

(21) Appl. No.: 16/325,566

(22) PCT Filed: Aug. 17, 2017

(86) PCT No.: PCT/EP2017/070885
§ 371 (c)(1),
(2) Date: Feb. 14, 2019

(87) PCT Pub. No.: WO2018/033608
PCT Pub. Date: Feb. 22, 2018

(65) Prior Publication Data
US 2019/0247153 A1    Aug. 15, 2019

(30) Foreign Application Priority Data
Aug. 17, 2016   (DE) .................... 10 2016 215 427.3

(51) Int. Cl.
*A61C 8/00*          (2006.01)
(52) U.S. Cl.
CPC .......... *A61C 8/0053* (2013.01); *A61C 8/0048* (2013.01); *A61C 8/0062* (2013.01);
(Continued)
(58) Field of Classification Search
CPC ... A61C 8/0053; A61C 8/0048; A61C 8/0062; A61C 8/0066; A61C 8/0068; A61C 8/005
See application file for complete search history.

(56) References Cited

U.S. PATENT DOCUMENTS 5,106,300 A * 4/1992 Voitik ................. A61C 8/0001
                                                  433/173
5,281,140 A * 1/1994 Niznick ................ A61C 8/005
                                                  433/172
(Continued)

FOREIGN PATENT DOCUMENTS

DE         9202396.7 U1     4/1992
DE         29606593.5 U1    6/1996
(Continued)

OTHER PUBLICATIONS

PCT/EP2017/070885 International Preliminary Report on Patentability dated Nov. 23, 2018.

*Primary Examiner* — Thomas C Barrett
*Assistant Examiner* — Shannel Nicole Belk
(74) *Attorney, Agent, or Firm* — Elmore Patent Law Group, P.C.; Joseph C. Zucchero; Carolyn S. Elmore

(57) ABSTRACT

A dental prosthesis system (30) with a dental implant (32) and with a prosthetic structure (34) mountable on the dental implant (32). The dental implant (32), for mounting of the prosthetic structure (34), forms a bearing face (52) serving as a support face for the prosthetic structure (34), and the prosthetic structure (34) forms a base face (54) adapted in terms of its contour to the bearing face (52), wherein the bearing face (52) and the base face (54) are provided with a number of guide pairings (56) which each comprise a guide rib (58) formed integrally on the dental implant (32) or the prosthetic structure (34) and a corresponding guide groove (60) formed integrally into the respective other component (32 or 34).

12 Claims, 18 Drawing Sheets

(52) U.S. Cl.
CPC .......... *A61C 8/0066* (2013.01); *A61C 8/0068* (2013.01); *A61C 8/005* (2013.01)

(56) References Cited

U.S. PATENT DOCUMENTS

| | | | |
|---|---|---|---|
| 5,336,090 A * | 8/1994 | Wilson, Jr. | A61C 8/008 |
| | | | 433/172 |
| 5,873,721 A | 2/1999 | Willoughby | |
| 6,386,877 B1 * | 5/2002 | Sutter | A61F 2/30771 |
| | | | 433/173 |
| 8,951,044 B2 | 2/2015 | Kikuchi | |
| 9,055,988 B2 * | 6/2015 | Galgut | A61C 8/0001 |
| 9,668,833 B2 * | 6/2017 | Fischer | A61C 8/0068 |
| 2007/0037123 A1 | 2/2007 | Mansueto et al. | |
| 2011/0223562 A1 * | 9/2011 | Zipprich | A61C 8/0069 |
| | | | 433/173 |
| 2012/0196250 A1 | 8/2012 | Grant et al. | |
| 2014/0141387 A1 * | 5/2014 | Kikuchi | A61C 13/235 |
| | | | 206/63.5 |
| 2015/0118651 A1 * | 4/2015 | Richard | A61C 8/0048 |
| | | | 433/201.1 |
| 2015/0305836 A1 * | 10/2015 | Fischer | A61C 8/0012 |
| | | | 433/173 |
| 2018/0042703 A1 * | 2/2018 | Martina | A61C 8/0074 |
| 2019/0008614 A1 * | 1/2019 | Weitzel | A61C 8/0024 |

FOREIGN PATENT DOCUMENTS

| | | |
|---|---|---|
| DE | 102008009547 A1 | 8/2009 |
| DE | 102010042933 A1 | 12/2011 |
| JP | H 06-178784 A | 6/1994 |
| WO | 2008113532 A1 | 9/2008 |
| WO | 2011138029 A1 | 11/2011 |
| WO | 2014131646 A2 | 9/2014 |

* cited by examiner

DENTAL PROSTHESIS SYSTEM AND PROSTHETIC STRUCTURE FOR USE WITH A DENTAL IMPLANT INSERTED INTO THE JAW BONE OF A PATIENT

FIELD OF THE INVENTION

The invention relates to a dental prosthesis system with a dental implant insertable into the jaw bone of a patient and with a prosthetic structure mountable on the dental implant. It also relates to a prosthetic structure for use with a dental implant inserted into the jaw bone of a patient, in particular in a dental prosthesis system.

BACKGROUND OF THE INVENTION

Dental prosthesis systems can be used within the framework of the reconstructive therapy to compensate for the loss of a tooth. Usually, such a prosthesis system comprises a dental implant, which is usually inserted into the jaw bone in the place of an extracted or shed tooth. After a healing-in phase of about four to twelve weeks, a prosthetic part or a crown serving as a denture piece is placed on the dental implant as a prosthetic structure and is fixed there. For this purpose, such a dental implant is usually designed as a suitably shaped metallic body which is inserted in the intended place in the jaw bone by screwing it in. As a rule, the apical end of the dental implant is provided with a screw thread, mostly a self-cutting screw thread, with which the dental implant is inserted into the correspondingly prepared implant bed.

Contrary to single-part dental implants, in which the prosthetics serving as a denture piece is fastened directly on the metallic body screwed into the jaw bone, two-part or multi-part implant systems are also known and widely used. In such a multi-part dental implant system, a so-called abutment is provided in addition to the dental implant properly speaking to be screwed into the jaw bone of the patient, in the manner of a connection or transition piece, which abutment carries the prosthetics or crown provided as a denture piece. After the dental implant properly speaking has healed into the jaw bone of the patient, the abutment provided with the prosthetics is put on the dental implant in the manner of completing the implant system and is connected with the dental implant.

Such a connection of the abutment provided for attaching the prosthetics to the inserted dental implant is usually produced by means of a screwed connection. In order to guarantee a sufficiently high mechanical stability of the entire system in view of the chewing loads which are to be expected, the abutment is usually provided with a connecting pin, which can be introduced into an associated accommodating channel in the dental implant, in the manner of a plug-in connection, and which guarantees, in assembled condition, a lateral and, if necessary, also an axial guidance and fixed positioning of the components relative to each other. Usually a screw channel for a connecting screw serving for connecting the abutment to the dental implant is integrated in this connecting pin. The connecting screw penetrates the screw channel and its outer thread engages into a corresponding inner thread formed in the dental implant, the screw head of the connecting screw resting on a counterbore in the abutment, arranged outside the screw channel, and, by means of said counterbore, pressing the abutment onto the post part when the connecting screw is being screwed in.

The prosthetics or denture piece properly speaking is usually attached on an assembly pin provided for that purpose, which is integrally formed on the base body of the abutment. Depending on the construction of the implant system, the prosthetics can be glued to said assembly pin or fastened thereto in another substance-locking way, alternatively, however, screw systems are also used, in which the prosthetics is fastened by means of a connecting screw. In that case, the latter engages into a thread arranged in the assembly pin. The space required for accommodating this thread entails, however, a reduction of the thickness of material in this area, which might lead to an undesired weakening and impairment of the mechanical strength of the system. In any case, it is the common feature of the above-mentioned systems that due to the assembly pin, which is necessary for a laterally and axially reliable fixing, specifically in view of the relatively high chewing loads, a certain overall height has to be accepted for the prosthesis, which in turn limits the flexibility of planning and adapting the prosthesis an the oral situation.

SUMMARY OF THE INVENTION

The invention is, therefore, based on the problem to provide a dental prosthesis system of the above-mentioned type, which even with high mechanical load-bearing capacity, offers a high flexibility in use and specifically also in adapting the prosthesis to the oral situation of the patient. Furthermore, a particularly suitable prosthetic structure for use in such a dental prosthesis system shall be provided.

With regard to the dental prosthesis system, this problem is solved according to the invention by the fact that the dental implant, at its front end provided for mounting of the prosthetic structure, forms a bearing face serving as a support face for the prosthetic structure, and the prosthetic structure forms a base face adapted in terms of its contour to the bearing face, the bearing face and the base face being provided with a number of guide pairings which each comprise a guide rib formed integrally on one of the faces and a corresponding guide groove introduced into the respective other face.

By "corresponding", one understands here in particular that the components "guide rib" on the one hand and "guide groove" on the other hand are adapted to each other spatially/geometrically, i.e. with regard to contour and dimensioning, so that the guide rib can be inserted into the corresponding guide groove, similar to a groove-and-key connection and possibly be brought to a positive locking.

The invention is based on the consideration that a particularly high flexibility, specifically in view of applicability, planning of use, but also adaptation and individualization in the mouth of the patient, can be achieved by keeping the total overall height, in particular, however, the system height above the tissue (above "tissue level"), consistently low. To enable this, the assembly pin usually formed on the dental implant or the latter's abutment, provided for mounting the prosthesis, should, therefore, be omitted, if possible, or its overall height should be reduced as far as possible. To ensure a long service life of the prosthetic system and specifically in view of the sometimes considerable forces introduced into the system, which are to be expected due to the chewing loads, this is, however, only possible by taking suitable measures for a specific absorption of these forces.

To enable this, it is now provided to specifically use the "clear width" in the area of the front end of the inserted dental implant, which usually widens above the tissue level, for introduction and transmission of forces. Omitting an assembly pin directly provided for this purpose, the front end of the dental implant shall form the bearing face for the prosthetic structure, on which the base face of said prosthetic structure can be mounted. To facilitate subsequent handling, this bearing face should be positioned above the tissue, i.e. above the "tissue level". For such a construction, it must, however, be taken into account in particular that the loads to be expected do not only have axial components, which can already be well compensated by the bearing face as such. Rather must one also expect in addition force components in lateral direction. To enable an introduction of these force components in a suitable manner and with high system stability, the contact area between the prosthetic structure and the inserted dental implant should be provided with suitable mechanical modifications, which enable a reliable introduction with high load-bearing capability, specifically for the lateral force components. For this purpose, a system of guide ribs and corresponding grooves is provided, which, paired in each case in the manner of a tooth gearing or comparable to a groove-and-key system, is able to introduce the corresponding force components, preferably for both compressive and tractive forces and/or in positive and negative spatial direction.

Both the dental implant and the prosthetic structure mountable thereon can, for their part, each be of a single or multi-part design, depending on the individual design. For example, the dental implant could be designed, in the manner of a single-part implant, with a front end which immediately forms the bearing face for the prosthetic structure, or, in another exemplary embodiment, it could also be of a two-part design—corresponding to the usual two-part implant—and comprise, in addition to the implant part properly speaking, i.e. the implant part to be inserted into the bone, a second implant part to be mounted thereon. Contrary to conventional abutments, such a second implant part would include, however, instead of the before-mentioned assembly pin, an advantageously relatively flat support face for the prosthesis, provided with the before-mentioned contact and guide elements and thus presenting the function of a platform part for the mounting of the prosthesis. Analogously, the prosthetic structure for its part could be of a single-part design and immediately form the desired denture piece. Alternatively, the prosthetic structure for its part could, however, also be of a two-part or multi-part design and comprise in particular a central support piece forming the base face for the bearing on the dental implant, and a prosthetic part arranged thereon, forming the prosthesis properly speaking. Such an embodiment, in which the central support piece for the prosthesis could take over the function of the abutment usual so far, but which could be provided, contrary to a conventional abutment, towards the dental implant, with an advantageously relatively flat base face provided with the before-mentioned contact and guide elements, is particularly advantageous in view of the choice of material for the before-mentioned components, because in this way, a different choice of material for the support piece on the one hand (for example titanium) and the prosthetic part properly speaking (for example ceramics) is possible.

In an advantageous development, the bearing face formed by the front end of the dental implant and corresponding therewith, the base face of the prosthetic structure, are of a substantially flat design, particularly preferably, of a completely flat design. This allows in a particularly simple manner, with the prosthesis mounted, a planar force-locking connection with a generally particularly low overall height of the system. The surface normal of the bearing face may be oriented obliquely or tilted against the longitudinal axis of the dental implant, which facilitates the mounting of a prosthesis which is tilted or angled relative to the longitudinal axis of the dental implant. Advantageously, the surface normal of the bearing face is, however, substantially oriented in parallel to the longitudinal axis of the dental implant, so that due to the achievable rotatory degrees of freedom, an individualized adaptation to the oral situation of the patient is possible during assembly in a particularly simple manner.

The guide ribs and, accordingly, the associated guide grooves can be formed integrally on or in the respective face, in the manner of individual, separate form elements. A particularly uniform and, therefore, reliable introduction also of different forces into the dental implant, as has to be expected with the possibly arising chewing loads, can, however, be achieved by designing, in a particularly advantageous embodiment, the or one of the guide ribs, in the manner of an annular bead and, correspondingly, the guide groove associated therewith, with a peripheral, closed contour. With such a peripheral contour, the reliable absorption of chewing loads is reliably possible, independently of the original direction of force. In addition, such a completely peripheral contour offers the considerable advantage that it can provide an additional sealing face for sealing off the enclosed interior, for example, against bacteria or impurities. In particular in case of angled structures, in which the bearing face is inclined relative to the longitudinal axis of the dental implant, such a peripheral, actually continuous contour can, however, also be provided with interruptions, according to requirements, for example to offer sufficient space for a possibly necessary screw channel for a connecting screw.

In another advantageous embodiment, the guide rib designed in the manner of an annular bead with a peripheral, closed contour and, accordingly, the guide groove associated therewith, form a non-round, particularly preferably an oval or trioval, cross-sectional contour relative to the longitudinal axis of the dental implant. The contour can in this case be adapted in particular to a corresponding outer contour of the dental implant in the latter's connection area. In particular, contours which—depending on the purpose and the specific place of insertion—imitate the typical outer contour of a tooth in the area of the place of use, i.e., for example, an oval, trioval or quadoval contour for teeth in the area of the anterior teeth or molar teeth, are considered as particularly advantageous for this purpose.

Thanks to such a non-round embodiment of the contour, the corresponding guide pair can, in additional to its function properly speaking, namely the suitable introduction of force, also present the functionality of an indexing, in which an assembly of the prosthetic structure is possible exclusively in those rotatory orientations in which the respective guide rib is rotatorily oriented so as to match the associated guide groove. Such an indexing can be offered in a variant considered as advantageous, by designing the respective guide rib (and, accordingly, the associated guide groove), viewed from top, as a peripheral band of approximately constant width, whose contour, viewed from top, has the before-mentioned non-round, preferably trioval or quadoval, shape. In an alternative advantageous embodiment, the respective guide rib (and, accordingly, the associated guide groove) can, however, also be designed, viewed from top, as a peripheral band with differently contoured lateral edges, one of the lateral edges having, for example, viewed from top, a round contour, and the indexing being effected via the other lateral edge, shaped, for example, viewed from top, in the manner of an ellipse, oval, trioval or quadoval.

On the other hand, it is also possible to choose a round outer cross-section for the dental implant and/or a round or circular outer contour, for the peripheral guide pair, such a design is useful in particular in applications for bridges or other multi-element prostheses, in which a plurality of teeth is treated or replaced by a single element.

In view of a particularly favorable growing-in into the jaw bone (the so-called osseointegration), the dental implant can have a non-round, preferably trioval, cross-section. In such a case, a very particularly preferred embodiment is provided with a guide rib (and, accordingly, an associated guide groove), which, viewed from top, forms a peripheral band whose outer lateral edge is designed and contoured in accordance with the outer contour or the outer cross-section of the dental implant. In this way, an approximately constant material thickness and, therefore, load-bearing capacity of the system in all cross directions to the longitudinal axis of the dental implant is possible in all cases, and weak points can be avoided.

In order to suitably compensate the expected different compressive and tractive forces arising as a consequence of the chewing load to be expected, the or one of the guide ribs includes advantageously a rib profile with different flank angles. The flank angle of the externally positioned flank is preferably smaller than that of the internally positioned flank. In an additional or alternative advantageous development, the rib profile of the or each guide rib is designed with one or two bulged flanks.

To increase the ease of assembly and to particularly facilitate in particular the adaptation of the prosthesis to the oral situation of the patient, the connection between the prosthetic structure and the dental implant is provided in a very particularly preferred development with an additional adjustment guide pairing. For this purpose, either the bearing face or the base face is advantageously provided with an adjustment collar formed integrally thereon, which is rotationally symmetrical relative to the longitudinal axis of the dental implant and has a collar height larger than the largest height of the guide ribs, the respective other face comprising a corresponding accommodating or adjustment groove formed therein. Particularly preferred heights are in that case for the guide ribs, a height of minimally 0.1 mm and maximally 1.5 mm, particularly preferably of minimally 0.3 mm and maximally 0.9 mm, and for the adjustment collar, a height of minimally 0.3 mm and maximally 2.5 mm, particularly preferably of minimally 0.5 mm and maximally 1.5 mm.

With such an embodiment, the final assembly, i.e. the mounting of the prosthetic component on the dental implant, can be very particularly simplified. When mounting the prosthetic component on the dental implant, first of all the adjustment collar can be brought into engagement with the associated recess or adjustment groove. When doing so, the further guide rib(s) formed integrally on do not interfere, due to the fact that their overall height is lower than that of the adjustment collar, so that through insertion of the adjustment collar into the adjustment groove, first of all the correct lateral position of the prosthetic structure relative to the dental implant can be determined in a relatively simple manner and without the user needing visual contact. Due to the preferably round outer contour of the adjustment collar and the corresponding, preferably also round inner contour of the recess or adjustment groove, one can then determine through rotation the correct rotatory orientation of the prosthetic component, maintaining the correct lateral positioning which had been obtained through the already partially engaged adjustment collar. This will be achieved as soon as the further guide rib(s) are brought into correct overlapping with the respective associated guide grooves. In this case, the latter can also be brought into engagement, and the base face of the prosthetic structure can be brought into contact with the bearing face of the dental implant up to the end stop.

Thus, this way of construction makes it possible to implement two substantial functiona-lities, which considerably facilitate the final assembly of the prosthetic system, namely, on the one hand, the lateral position finding when joining the components and, on the other hand, the correct rotatory orientation relative to each other, in a common height area, namely immediately in the height area of the connection defined by the bearing face of the dental implant and the base face of the prosthesis resting thereon. In this way, both a particularly efficient cooperation of the components and a generally very low overall height can be achieved. It will be particularly advantageous in this case if the adjustment pairing provided for position finding is positioned relatively inwardly, i.e. close to the central axis of the system, and is enclosed outwardly by the guide pairing(s). In this way, the overall height of the individual components in the outer area can be kept relatively low, whereas the relatively larger overall height of the elements of the adjustment pairing is limited to the central spatial area.

A particularly simple way of construction can be achieved if the dental implant includes in an advantageous embodiment a central accommodating channel for a connecting screw, the adjustment collar or the corresponding adjustment groove being arranged peripherally immediately around the front-end inlet opening of the accommodating channel.

In another particularly preferred embodiment, which is considered as independently inventive, the dental prosthesis system, and very particularly preferably, the system consisting of guide groove and guide rib and/or the adjustment guide pairing, is provided with a snap-in locking system. This makes it possible in a particularly simple manner to repeated fix and detach the prosthetic component on the dental implant, as might be necessary in particular for adapting the prosthesis to the oral situation. The prosthetic component can in this case be provisionally fixed by snapping it on the dental implant, in the manner of a provisional mounting, as might be desirable, for example, for determining the oral situation and immediately adjusting the prosthesis. Then, the prosthetic component can be removed and, if required, touched up, until it is correctly adapted to the oral situation. Afterwards, the finished prosthesis can be finally assembled.

In another advantageous embodiment, the system consisting of guide rib and guide groove can be suitably designed to form the snap-in locking system, for example by providing the guide groove, at least in certain sections, with a number of undercuts, into which spring or snap-in elements arranged on the guide rib can suitable engage. Alternatively or additionally, the adjustment guide pairing can be provided with a corresponding snap-in locking system.

In a very particularly preferred embodiment, which is also considered as independently inventive, the connecting screw provided for joining the components to each other is provided with a number of snap-in or spring elements, which can engage or snap in into a corresponding undercut in the accommodating channel for the connecting screw. With this embodiment it is possible, even in case of relatively slim systems, which offer only little constructional space, to provisionally fix the components to each other by engaging the connecting screw into the accommodating channel, in the manner of a pre-assembly. The system provisionally mounted in this way can afterwards be detached again easily and without problems, for the purpose of being touched up.

In a particularly advantageous embodiment, the dental prosthesis system is designed for an inherent protection against assembly errors due to rotatory positioning faults. For this purpose, the dental implant and the prosthetic structure advantageously include a central accommodating channel for a connecting screw, the connecting screw, in particular its length, being dimensioned such, taking into account the spatial dimensions of the dental implant and the prosthetic structure, that its screw thread will only engage into a corresponding internal thread arranged in the dental implant, after the or each guide rib has engaged into its respective associated guide groove. Preferably, the connecting screw possesses a fine-pitch thread whose pitch is smaller than that of a DIN thread.

The embodiment of a dental implant as such and also of a prosthetic structure as such in accordance with the above explanations and with the corresponding modifications are each expressly considered as independently inventive, independently of each other. In particular, the before-mentioned problem of the prosthetic structure for use with a dental implant inserted into the jaw bone of a patient, in particular in a dental prosthesis system according to the above-mentioned type of construction, is solved by a base face which is provided for resting on a support face of the dental implant and on which a number of guide ribs are formed integrally and/or in which a number of guide grooves are formed.

Advantageously, the prosthetic structure includes a central accommodating channel for a connecting screw, which has a widened channel cross-section in the area of its outlet opening on the base face for forming an adjustment groove or a recess whose function corresponds to that of said adjustment groove, for accommodating the adjustment collar.

The advantages achieved with the invention consists in particular in that the guide pairings formed by the guide rib or the respective guide ribs in combination with the guide groove or the respective associated guide grooves, even in case of a substantially planar contact or bearing face between the dental implant and the prosthetic structure and even in case of a particularly low overall height, enable a reliable and long-lived introduction of both axial and lateral forces as a consequence of the expected chewing load into the dental implant and, via the latter, into the jaw bone. In this way, it is possible to achieve a high mechanical stability and loadability of the system, even in case of a low overall height and a correspondingly increased flexibility of the design of the superstructure which is present above the implant.

BRIEF DESCRIPTION OF THE DRAWINGS

An exemplary embodiment of the invention is explained in detail by means of a drawing in which.

DETAILED DESCRIPTION

Identical parts are identified in all figures by the same reference numbers.

Figure 1:
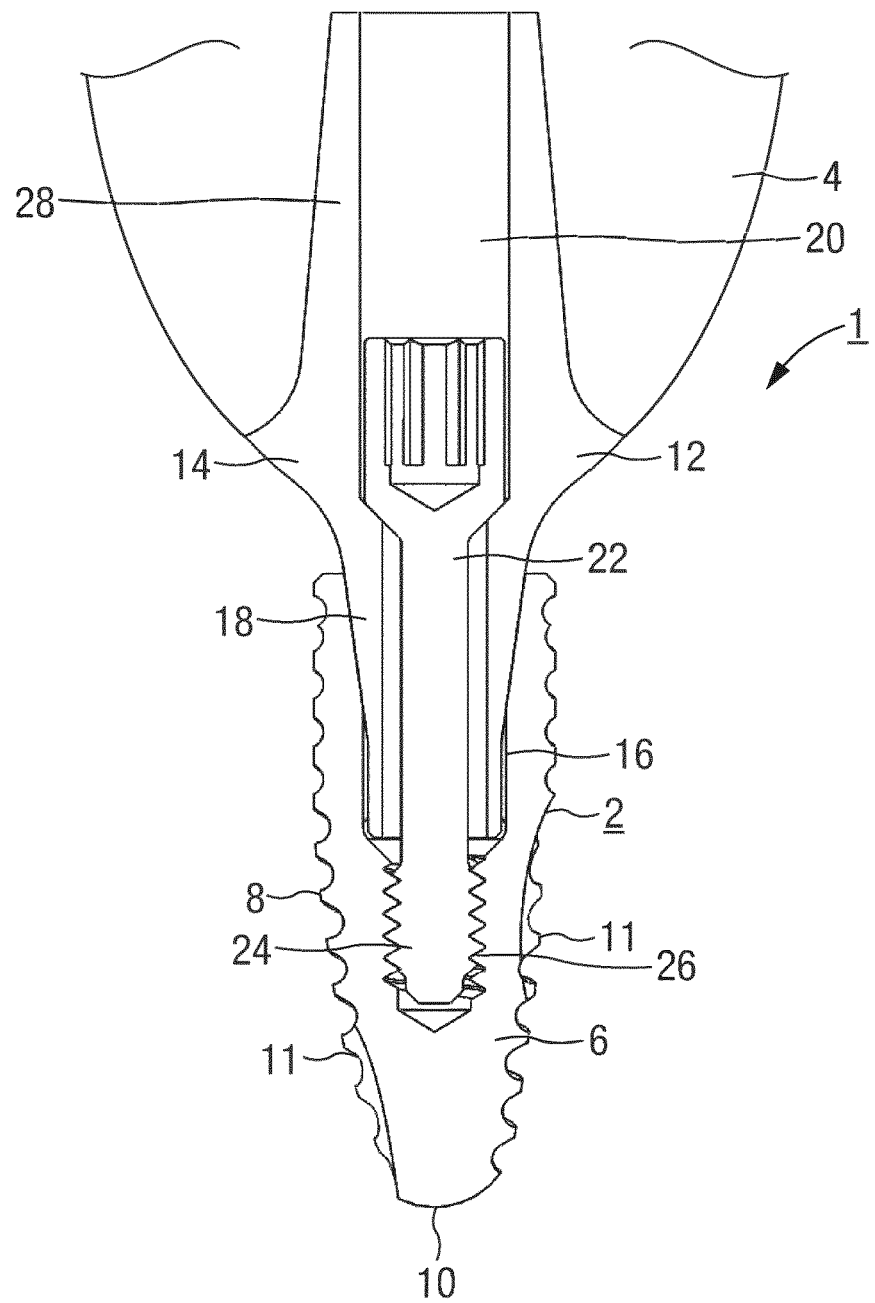
FIG. 1 is a longitudinal section of a dental prosthesis system according to prior art.

The dental prosthesis system 1 according to FIG. 1 is known from prior art and provided for use in the jaw bone of a patient and, there, for compensating for the loss of a tooth. The dental prosthesis system 1 comprises a dental implant 2, which is inserted into the jaw bone in the place of an extracted or shed tooth, and a prosthetic structure 4, not shown in detail in the figure, which is mountable on the dental implant 2 and which forms the denture piece properly speaking. When inserting the dental prosthesis system 1, first of all the dental implant 2 is inserted into the jaw bone. After a healing-in phase of about four to twelve weeks, the prosthetic structure 4 serving as a denture piece is placed on the dental implant 2 and is fixed there.

The dental implant 2 can be of a single-part design, but in the variant shown, it is of a multi-part design. It comprises as one component the implant body 6, which is designed as a suitably shaped metallic body of titanium and is provided with an external thread 8, for being screwed into the jaw bone in the intended place. The apical end 10 of said external thread 8 is designed as a self-cutting screw thread, to facilitate the insertion, and it comprises, furthermore, a number of integrated cutting grooves 11. As a further component, the dental implant 2 comprises an abutment 12. The latter comprises a base body 14, made from a suitably chosen material, preferably from a material based on titanium or a ceramic material, in view of the desired biocompatibility. A connecting pin 18, which can be introduced into an associated accommodating channel 16 of the implant body 6 and whose dimensions are adapted to a possibly provided indexing, is formed integrally on said base body 14. The cross-section of the connecting pin 18 can be round, non-round, for example hexagonal, or else, in the manner of a mixed shape, a combination by segments of round and non-round zones, to generate an indexing. In the variant shown, the implant body 6 is designed with a trioval outer cross-section, in particular in the area of the external thread 8, for a particularly favorable osseointegration, i.e. for a good healing-in into the jaw bone.

The central inner area of the abutment 12 includes an accommodating channel 20 for a connecting screw 22. In the mounted condition shown, the external thread 24 of said connecting screw 22 engages into an internal thread 26 in the implant body 6, so that a stable connection of the components is produced. For mounting the prosthetic structure 4, an assembly pin 28 with a relatively large lengthwise dimension is formed integrally on the abutment 12, on which pin the prosthetic structure 4 can be, for example, glued. The lengthwise dimension of the assembly pin 28 is suitably chosen in view of a sufficiently high mechanical stability also against the laterally introduced forces due to the chewing load to be expected, this being accompanied, however, in an actually undesired manner, by a relatively large overall height of the prosthesis system 1.

Figure 2:
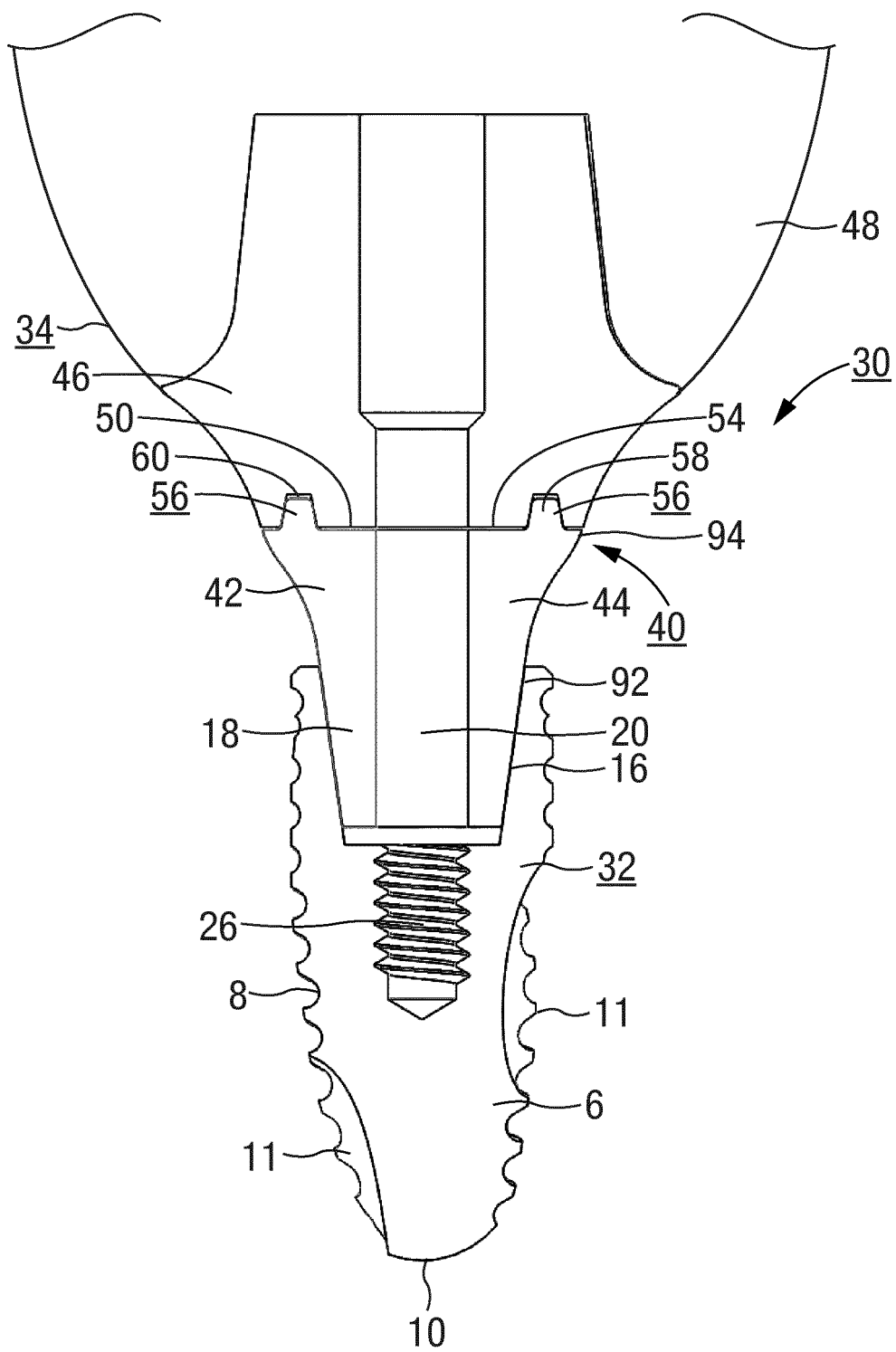
FIG. 2 is a longitudinal section of a dental prosthesis according to the invention, FIG. 3A to FIG. 3J is one representation of an embodiment of the implant-prosthesis connection of the prosthesis system of FIG. 2, FIG. 4A to FIG. 4J is another representation of an embodiment of the implant-prosthesis connection of the prosthesis system of FIG. 2, FIG. 5A to FIG. 5J is another representation of an embodiment of the implant-prosthesis connection of the prosthesis system of FIG. 2, FIG. 6A to FIG. 6K is another representation of an embodiment of the implant-prosthesis connection of the prosthesis system of FIG. 2, FIG. 7A to FIG. 7J is another representation of an embodiment of the implant-prosthesis connection of the prosthesis system of FIG. 2, FIG. 8A to FIG. 8E is another representation of an embodiment of the implant-prosthesis connection of the prosthesis system of FIG. 2, FIG. 9A to FIG. 9E is another representation of an embodiment of the implant-prosthesis connection of the prosthesis system of FIG. 2, FIG. 10A to FIG. 10E is another representation of an embodiment of the implant-prosthesis connection of the prosthesis system of FIG. 2, FIG. 11A and FIG. 11B show a modified connecting screw with a snap hook formed integrally thereon.

To counteract this, the dental prosthesis system 30 according to the invention is provided, an exemplary embodiment of which is shown in FIG. 2. This system, too, comprises a dental implant 32 and a prosthetic structure 34 mountable on the dental implant 32 and forming the denture piece properly speaking. To achieve the desired effects, namely a high mechanical stability also against laterally introduced forces and, at the same time, a low overall height, the dental prosthesis system 30 is provided with a specifically designed connection 40 between the dental implant 32 and the prosthetic structure 34, which is considered as independently inventive 4.

The dental implant 32 could also be made of a single-part design, in which case the connection 40 would be provided in the area of the end-side front face. The exemplary embodiment shows, however, a multi-part dental implant 32, which comprises as one of its components an implant body 6 which may be of the same construction as the known implant 2. Instead of the abutment 12, however, a platform part 42 for producing the connection 40 with the prosthetic structure 34 is provided as a further component of the dental implant 32 in the embodiment of the invention shown. The platform part 42 comprises a base body 44 made from a suitably chosen material, preferably from a material based on titanium or a ceramic material, in view of the desired biocompatibility. A connecting pin 18, which can be introduced into an associated accommodating channel 16 of the implant body 6 and whose dimensions are adapted to a possibly provided indexing, is formed integrally on said base body 44. The cross-section of the connecting pin 18 can be round, non-round, for example hexagonal, or else, in the manner of a mixed shape, a combination by segments of round and non-round zones, to generate an indexing. In the exemplary embodiment shown, too, the implant body 6 is designed with a trioval outer cross-section, in particular in the area of the external thread 8, for a particularly favorable osseointegration, i.e. for a good healing-in into the jaw bone.

The prosthetic structure 34 can also be of a single-part design and can consist exclusively of the prosthesis formed properly speaking for forming the denture piece. In the exemplary embodiment, however, the prosthetic structure is also of a multi-part design and comprises a central support piece 46 provided for the actual connection with the dental implant 32 and a prosthetic part 48 arranged thereon and forming the prosthesis properly speaking. Through this way of construction, a different choice of material for the support piece 46 on the one hand (in the exemplary embodiment, titanium) and the prosthetic part 48 properly speaking (in the exemplary embodiment, ceramic) is possible.

The dental prosthesis system 30 is designed to a particularly high degree for the purpose that even with a high mechanical load-bearing capacity due to the forces to be expected through the chewing load, a high flexibility in use and specifically also in the adaptation of the prosthesis to the oral situation of the patient is given. To enable this, the dental prosthesis system 30 is specifically designed in the area of the connection 40 between the dental implant 32 and the prosthetic structure 34 for a particularly low total overall height. For this purpose, the dental implant 32 forms on its front end 50 provided for mounting the prosthetic structure 34, a relatively flat, substantially planar bearing face 52 as a support face for the prosthetic structure 34. In accordance therewith, the prosthetic structure 34 is designed such that it forms a base face 54, whose contour is adapted to the bearing face 52 and which is also relatively flat and substantially planar.

Through this configuration, it is achieved that, maintaining a very low overall height, forces acting in axial direction are reliably introduced by the prosthetic structure 34 into the dental implant 32 and via the latter, into the jaw bone. To enable in this case a particularly simple assembly of the components in the mouth of the patient, the before-mentioned components are dimensioned such that the bearing face 52 of the dental implant 32, which in the present case is formed by the platform part 42, is positioned in assembled condition above the tissue, so that the dental implant 32 forms a so-called "tissue-level" implant. Thus, the bearing face 52 of the platform part 42 forms an easily accessible platform for mounting the prosthetic structure 34.

The dental prosthesis system 30 is, however, also designed for high mechanical stability and load-bearing capacity against force components acting in lateral direction. For this purpose, the bearing face 52 and the base face 54 are provided with a number of guide pairings 56 which effect, in the manner of a groove-and-key combination, an at least partial interlocking and/or form-locking connection of the dental implant 32 and the prosthetic structure 34 in lateral force direction.

For this purpose, the or each guide pairing 56 comprises one guide rib 58 formed integrally on one of the faces 52, 54 and a corresponding guide groove 60 formed in the respective other face 54 or 52. In the exemplary embodiment, the guide ribs 58 are arranged, in the manner of protruding beads or shapes formed on the bearing face 52 and thus, on the dental implant 32, the corresponding guide grooves 60 provided for accommodating the guide ribs 58 being integrated in the base face 54 and thus, in the prosthetic component 34. Of course, however, also a different embodiment is possible, in which the guide ribs 58 are provided on the prosthetic structure 34 and the guide grooves 60 are provided in the dental implant 32.

In the following, variants and further details of the connection 40 according to the invention are explained, by means of representations of the components of the platform part 42, on the one hand, provided in the present case for constituting the invention, and of the support piece 46, which shall, of course, include variants in which corresponding embodiments are arranged directly on an implant body and/or a prosthetic part.

Figure 3A:
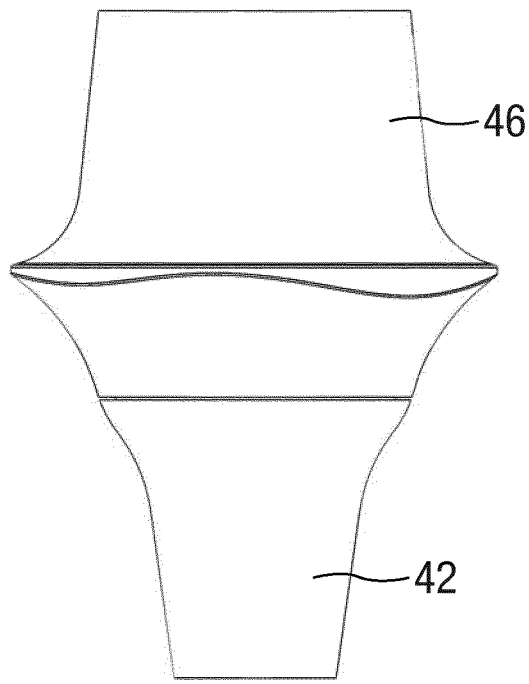
Figure 3B:
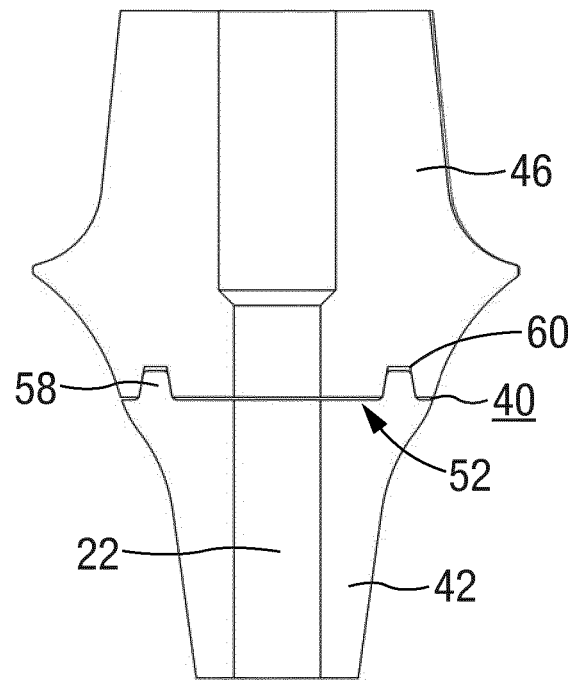
Figure 3C:
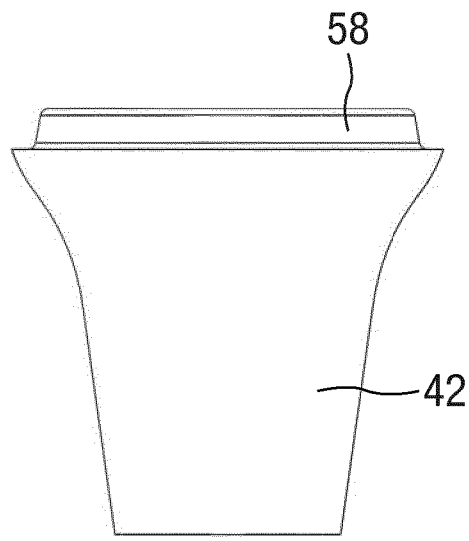
Figure 3D:
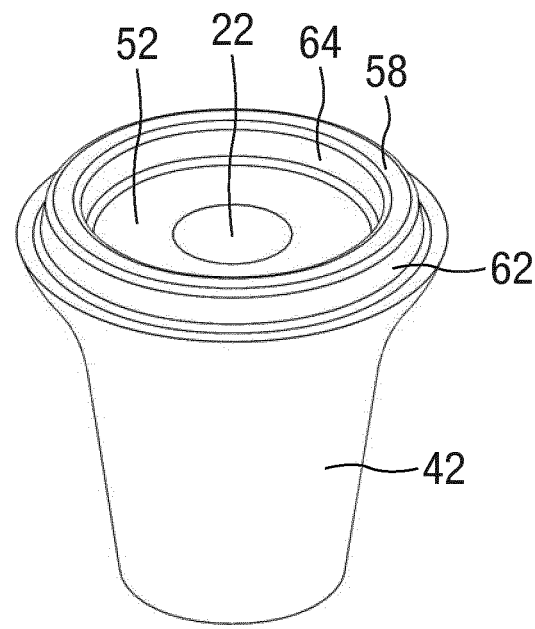
Figure 3E:
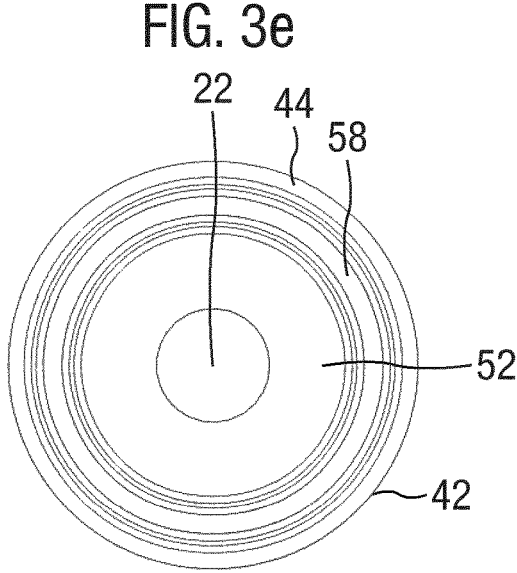
Figure 3F:
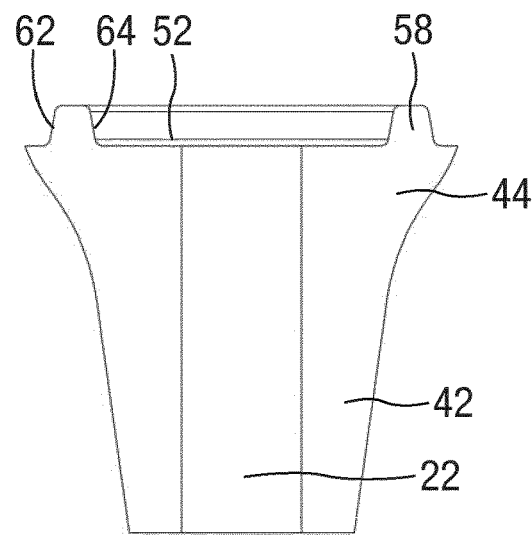
Figure 3G:
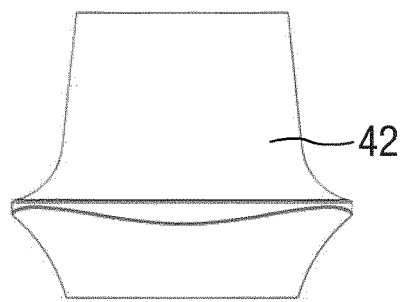
Figure 3H:
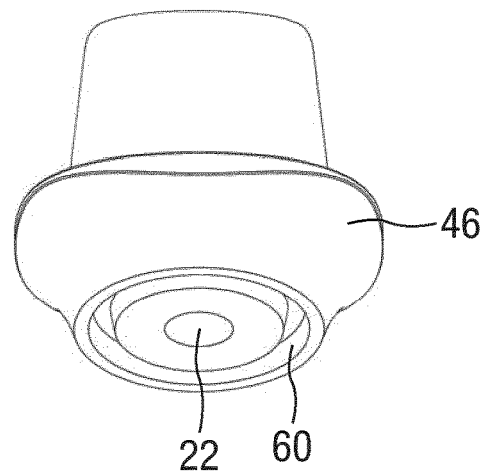
Figure 3I:
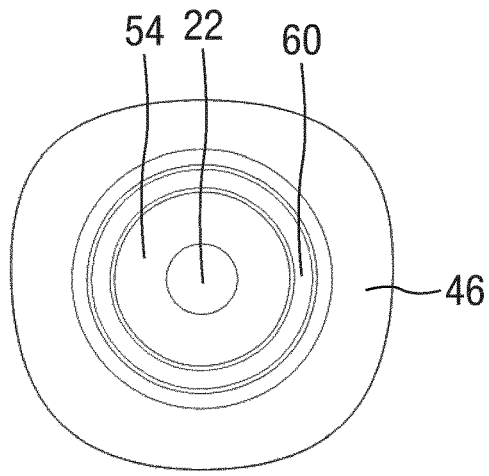
Figure 3J:
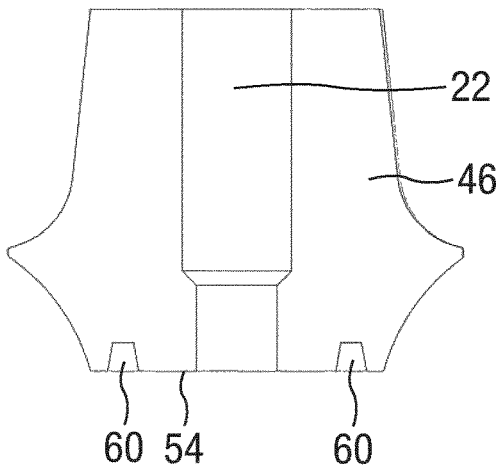
Figure 4A:
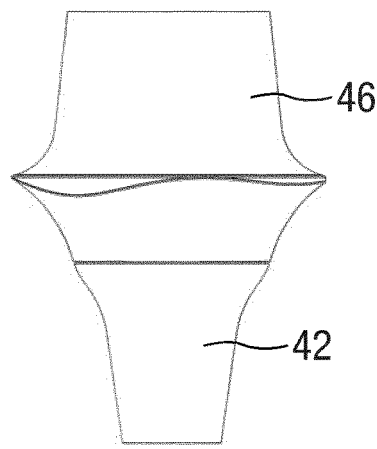
Figure 4B:
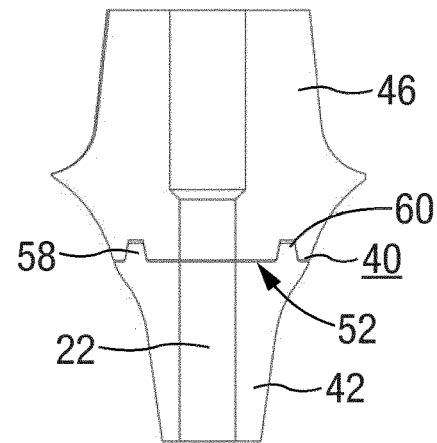
Figure 4C:
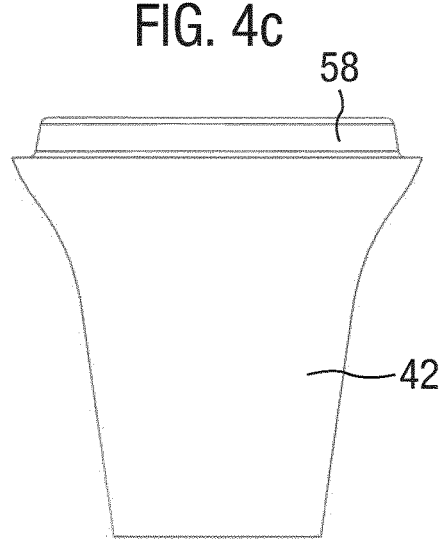
Figure 4D:
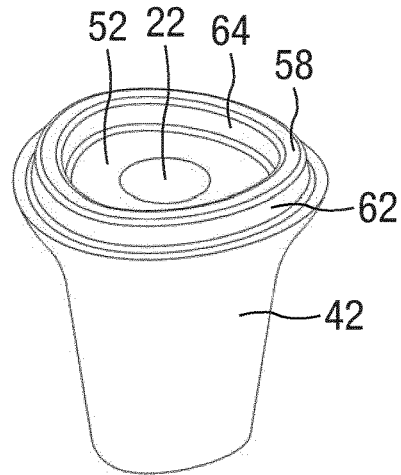
Figure 4E:
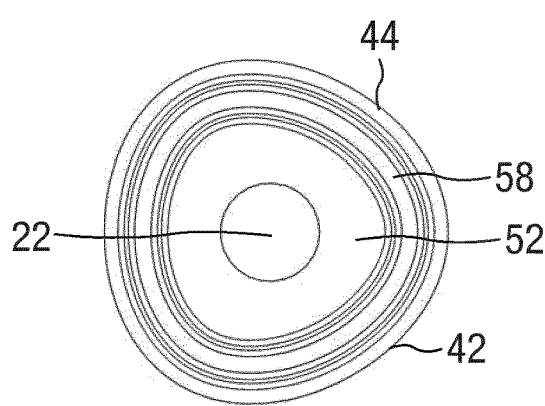
Figure 4F:
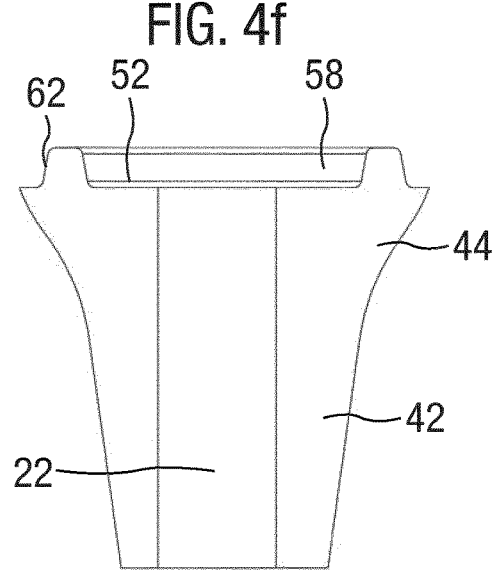
Figure 4G:
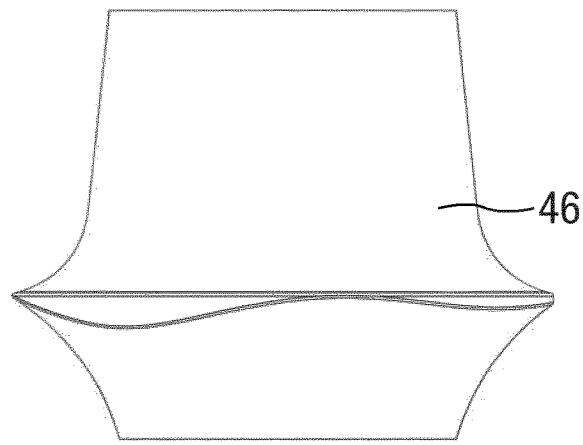
Figure 4H:
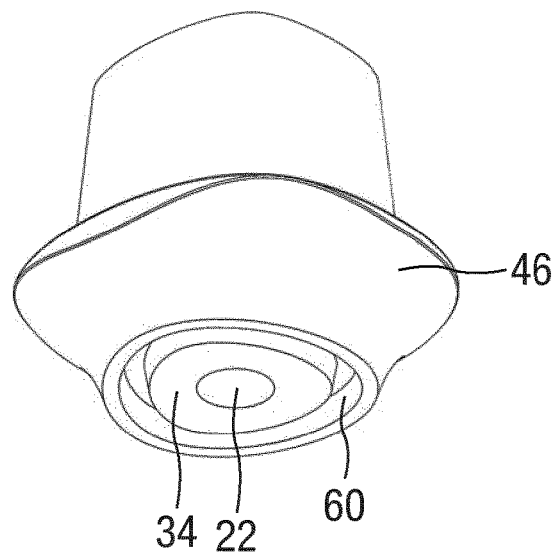
Figure 4I:
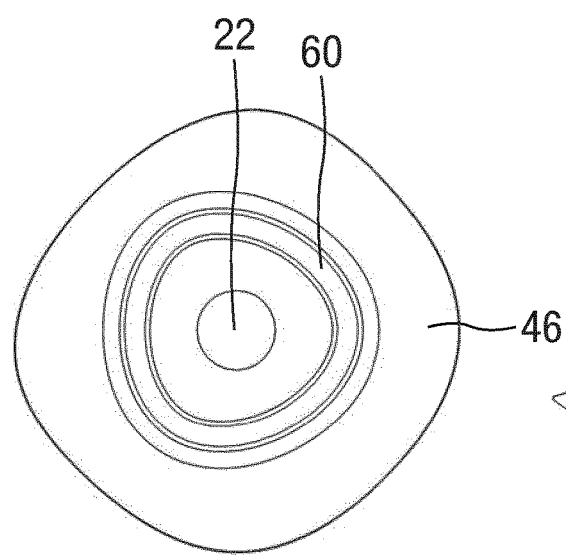
Figure 4J:
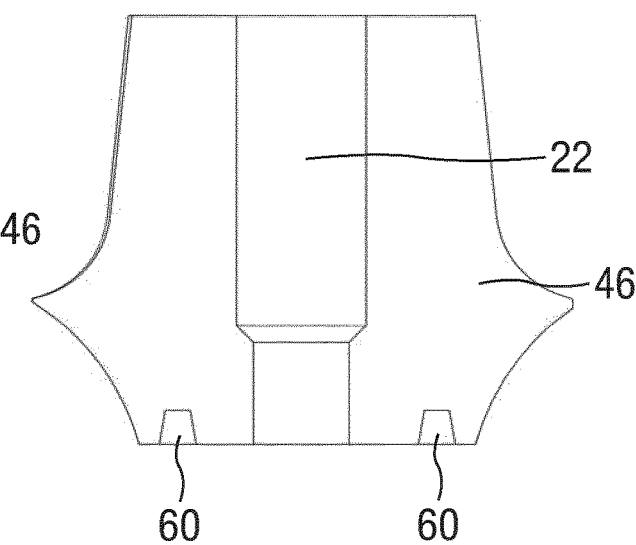

FIG. 3 shows an exemplary embodiment of the invention, FIG. 3a being a side view of the components platform part 42 and support piece 46 connected with each other, FIG. 3b being a longitudinal section of the components platform part 42 and support piece 46 connected with each other, FIG. 3c being a side view of the platform part 42, FIG. 3d being a lateral top view of the platform part 42, FIG. 3e being a top view of the platform part 42, FIG. 3f being a longitudinal section of the platform part 42, FIG. 3g being a side view of the support piece 46, FIG. 3h being a lateral bottom view of the support piece 46, FIG. 3i being a bottom view of the support piece 46, and FIG. 3j being a longitudinal section of the support piece 46.

In the present exemplary embodiment according to FIG. 3, only one guide rib 58 is provided (analogously and in adapted contouring, of course, also one guide groove 60). The guide rib 58 and accordingly the guide groove 60 associated therewith, is designed, in the manner of an annular bead formed integrally on the bearing face 52, with a peripheral, closed contour. Thanks to such a peripheral contour, the reliable absorption of chewing loads is reliably possible, independent of the original force direction, a sealing effect for the interior being additionally given as a further advantage in the system in assembled condition, in the manner of an additional function.

It is, furthermore, seen in the representation of FIG. 3 that the guide rib 58 (and accordingly the guide groove 60 associated therewith), which is designed in the manner of an annular bead with a peripheral, closed contour, forms a round contour with its lateral edges 62, 64, relative to the longitudinal axis of the dental implant, viewed from top, just like the base body 44 of the platform part 42 has in this case a circular outer cross-section. Besides, both components include the accommodating channel 22 for the connecting screw.

Contrary thereto, FIG. 4 shows an exemplary embodiment with a non-round, namely a trioval contour, adapted, in the exemplary embodiment, to the outer cross-section of the implant body 6. FIG. 4a is a side view of the components platform part 42 and support piece 46 connected with each other, FIG. 4b is a longitudinal section of the components platform part 42 and support piece 46 connected with each other, FIG. 4c is a side view of the platform part 42, FIG. 4d is a lateral top view of the platform part 42, FIG. 4e is a top view of the platform part 42, FIG. 4f is a longitudinal section of the platform part 42, FIG. 4g is a side view of the support piece 46, FIG. 4h is a lateral bottom view of the support piece 46, FIG. 4i is a bottom view of the support piece 46, and FIG. 4j is a longitudinal section of the support piece 46. The non-round, trioval design of the contour of the guide rib 58 on the one hand and the corresponding guide groove 60 on the other hand are clearly recognized. Thanks to such a non-round embodiment of the contour, the corresponding guide pair 56 presents, in addition to its function properly speaking, namely the suitable introduction of forces, also the functionality of an indexing, so that the assembly of the prosthetic structure 34 on the dental implant 32 is possible exclusively in those rotatory orientations in which the guide rib 58 is rotatorily oriented so as to match the associated guide groove 60.

In the exemplary embodiments shown FIG. 3, 4, the guide rib 58 is designed, viewed from top, as a peripheral band of approximately constant width. For this purpose, the contours of the two lateral edges 62, 64 are adapted to each other, having, viewed from top, the above-mentioned round or non-round, preferably trioval or quadoval shape. In an alternative embodiment, the guide rib 58 (and, accordingly, the associated guide groove 60) can, however, also be designed, viewed from top, as a peripheral band with differently contoured lateral edges 62, 64, one of the lateral edges 64 having, for example, viewed from top, a round contour, and the indexing being effected via the other lateral edge, shaped, for example, viewed from top, in the manner of a triovally or quadovally shaped lateral edge 62.

The design of the guide rib 58 and the associated guide groove 60 each as a peripheral, continuous band has the considerable advantage in the two before-mentioned variants (and also in the following variants) that this will greatly facilitate the manufacture, for example, by milling, in particular because abrupt changes of the contour can be avoided. This ease of manufacture might enable the use of completely novel classes of material in such a system; for example, a ceramic body provided within the framework of the prosthetic structure 34 could be provided with such a groove in a relatively simple manner and with high production safety.

An alternative, particularly preferred embodiment of the connection 40 of the dental prosthesis systems 1, which is considered as independently inventive, is shown in FIG. 5. FIG. 5a is a side view of the components platform part 42 and support piece 46 connected with each other, FIG. 5b is a longitudinal section of the components platform part 42 and support piece 46 connected with each other, FIG. 5c is a side view of the platform part 42, FIG. 5d is a lateral top view of the platform part 42, FIG. 5e is a top view of the platform part 42, FIG. 5f is a longitudinal section of the platform part 42, FIG. 5g is a side view of the support piece 46, FIG. 5h is a lateral bottom view of the support piece 46, FIG. 5i is a bottom view of the support piece 46, and FIG. 5j is a longitudinal section of the support piece 46.

This particularly preferred variant comprises as additional components, compared with the above-explained variants, an adjustment guide pairing 70, which, in the exemplary embodiment, consists of an adjustment collar 72, which is formed integrally on the bearing face 5 and is rotationally symmetrical relative to the longitudinal axis of the dental implant, and of a corresponding adjustment groove formed in the base face 54, in the exemplary embodiment, an adjustment recess 74. The adjustment collar 72 has a round outer contour, and adapted thereto, the inner cross-section of the adjustment recess 74 is also round. The height of the adjustment collar 72 is larger than the largest height of the guide rib 58. In this way, it is achieved that the final assembly, i.e. the mounting of the prosthetic component 34 on the dental implant 32, can be very particularly simplified. When mounting the prosthetic component 34 on the dental implant 32, first of all the adjustment collar 72 can be brought into engagement with the associated adjustment recess 74.

When doing so, the further guide rib 58 formed integrally on does not interfere, due to the fact that its overall height is lower than that of the adjustment collar 72, so that through insertion of the adjustment collar 72 into the adjustment recess 74, first of all the correct lateral position of the prosthetic structure 34 relative to the dental implant 32 can be determined in a relatively simple manner and without the user needing visual contact. Due to the provided round outer contour of the adjustment collar 72 and the corresponding, also round inner contour of the adjustment recess 74, one can then determine through rotation the correct rotatory orientation of the prosthetic component 34, maintaining the correct lateral positioning which had been obtained through the already partially engaged adjustment collar 72. This will be achieved as soon as the guide rib 58 is brought into correct overlapping with the guide groove 60 associated thereto. In this case, the latter can also be brought into engagement, and the base face 54 of the prosthetic structure 34 can be brought into contact with the bearing face 52 of the dental implant 32 up to the end stop.

The adjustment collar 72 is arranged peripherally immediately around the front-face outlet opening 78 of the accommodating channel 22.

Figure 5A:
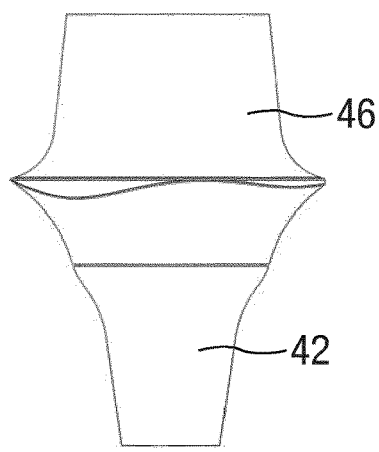
Figure 5B:
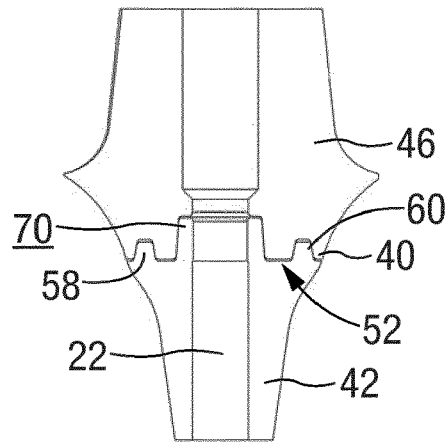
Figure 5C:
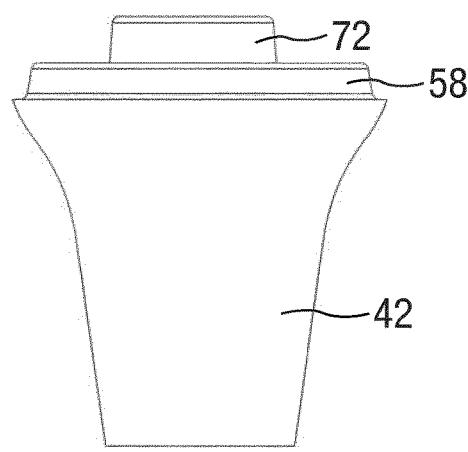
Figure 5D:
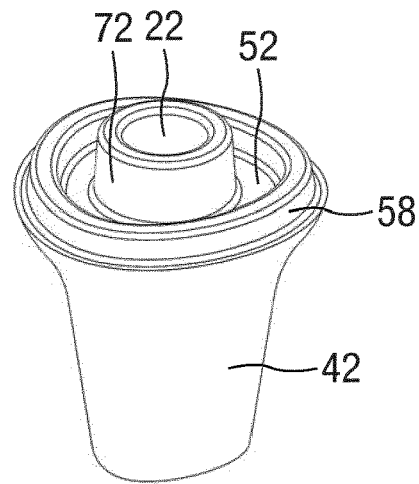
Figure 5E:
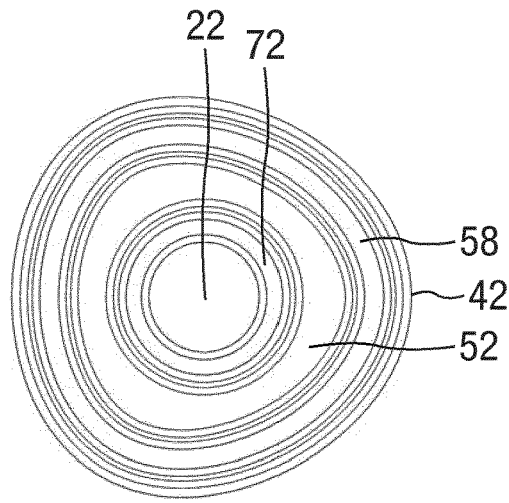
Figure 5F:
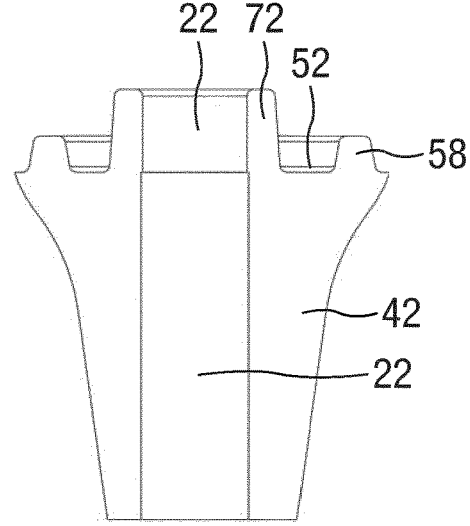
Figure 5G:
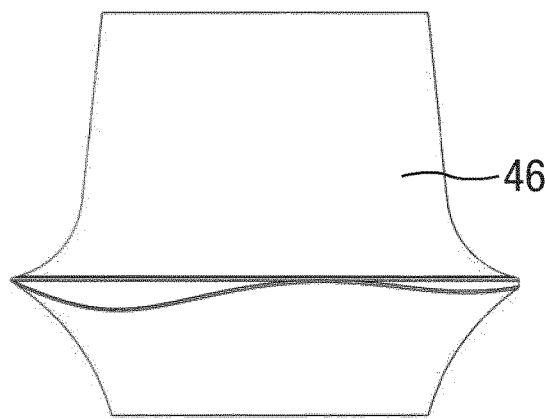
Figure 5H:
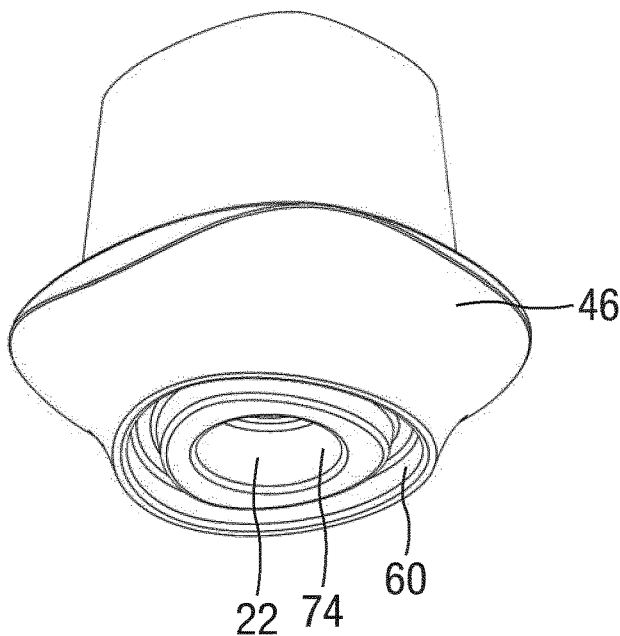
Figure 5I:
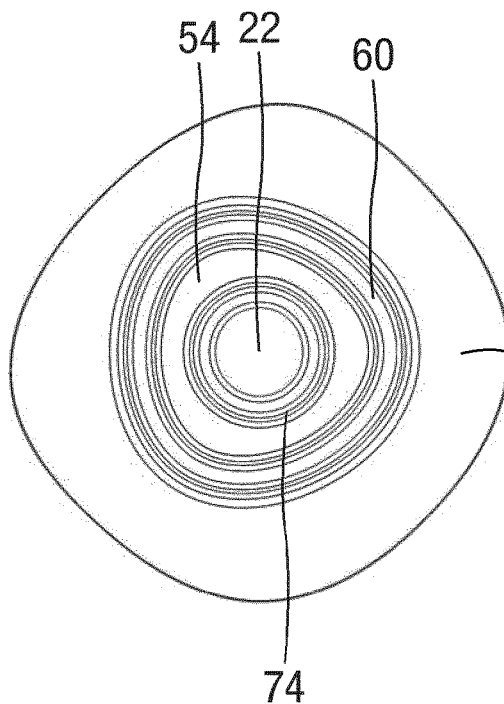
Figure 5J:
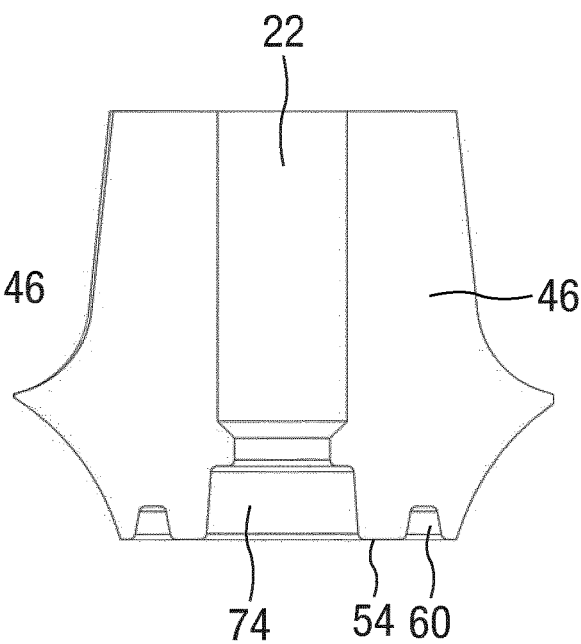
Figure 6A:
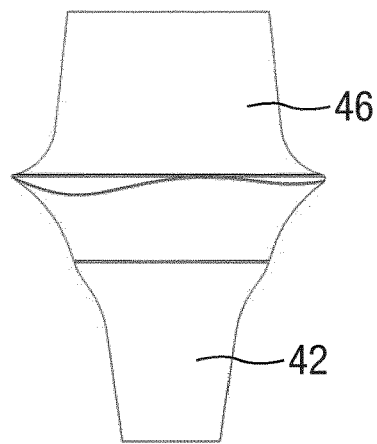
Figure 6B:
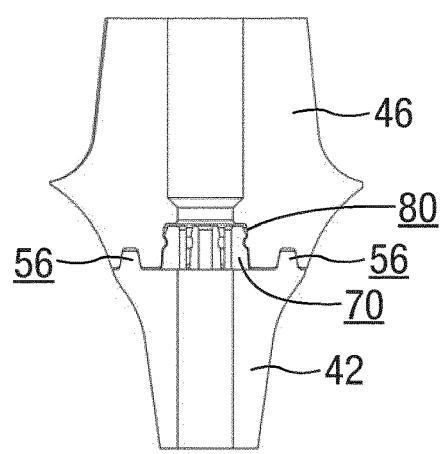
Figure 6C:
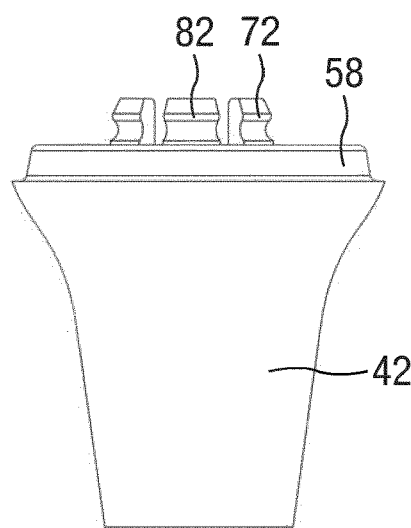
Figure 6D:
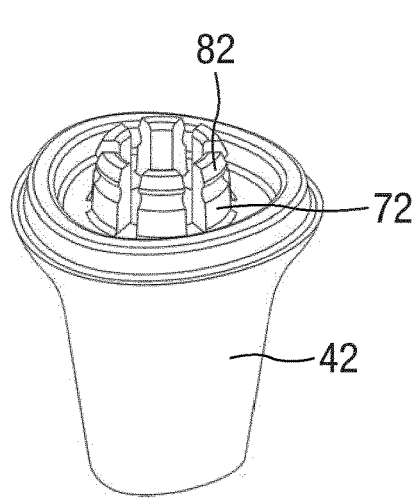
Figure 6E:
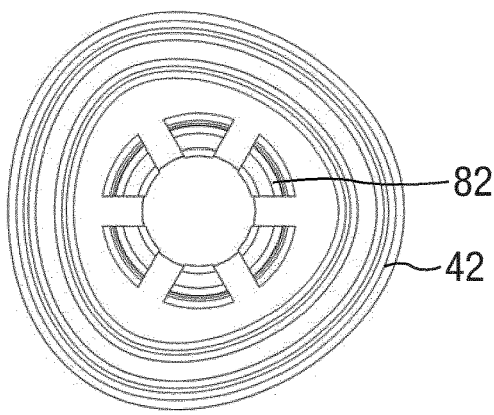
Figure 6F:
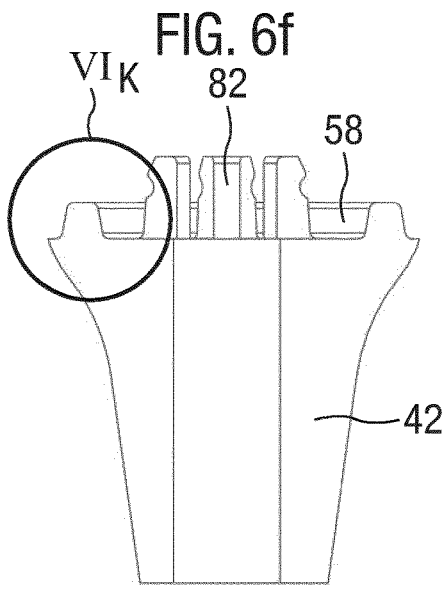
Figure 6G:
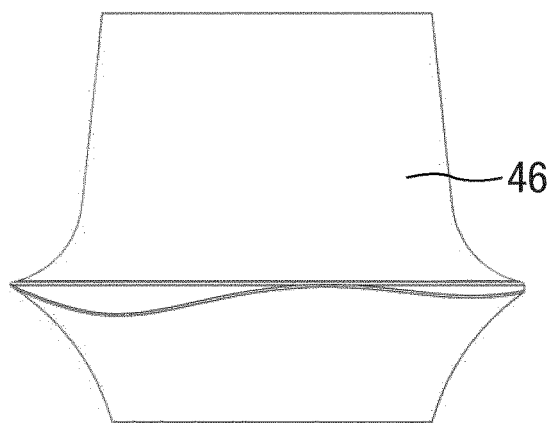
Figure 6H:
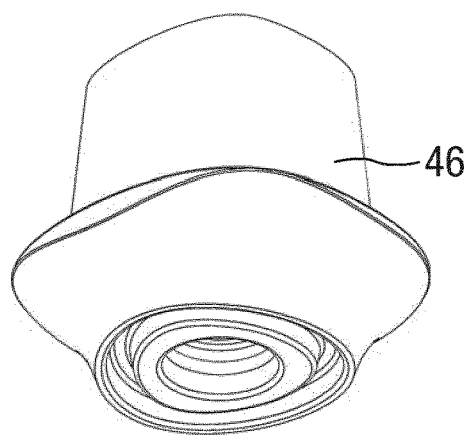
Figure 6I:
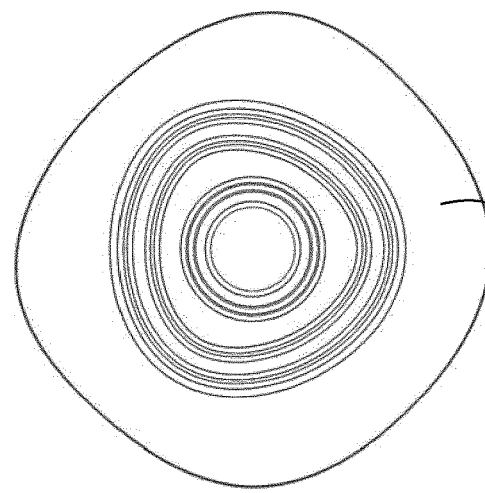
Figure 6J:
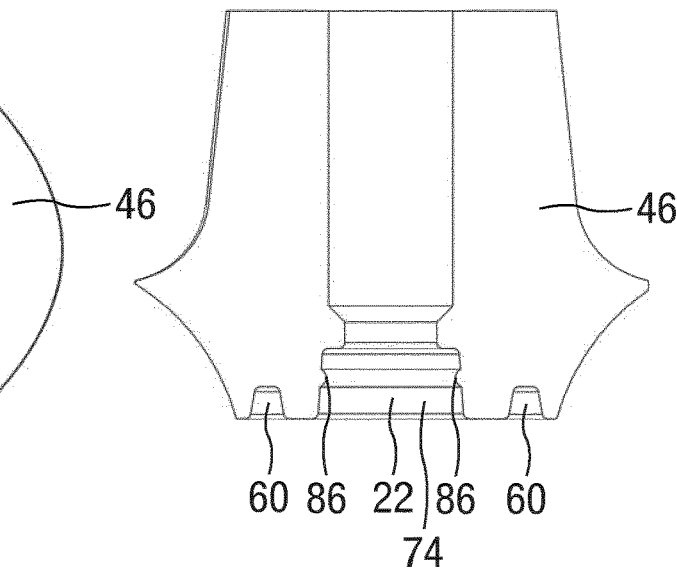
Figure 6K:
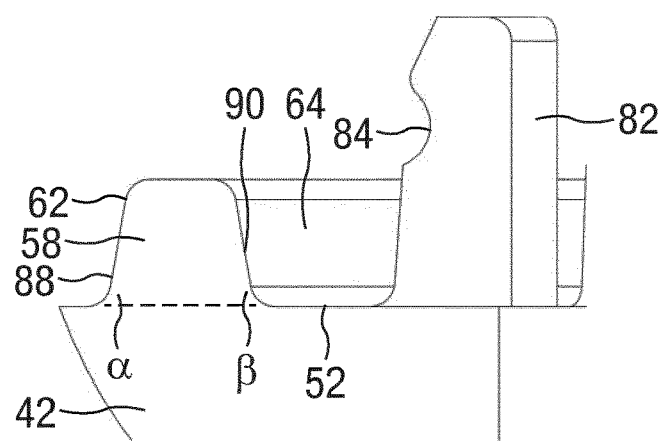
Figure 7A:
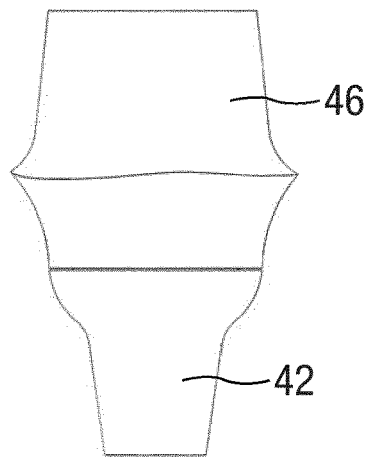
Figure 7B:
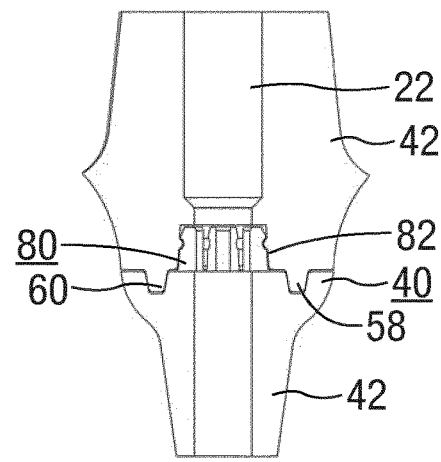
Figure 7C:
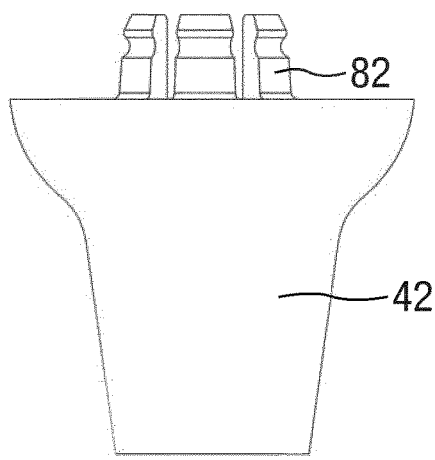
Figure 7D:
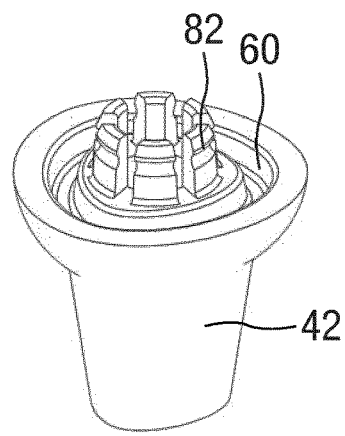
Figure 7E:
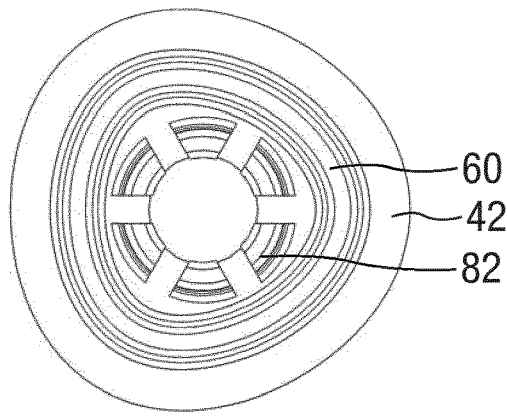
Figure 7F:
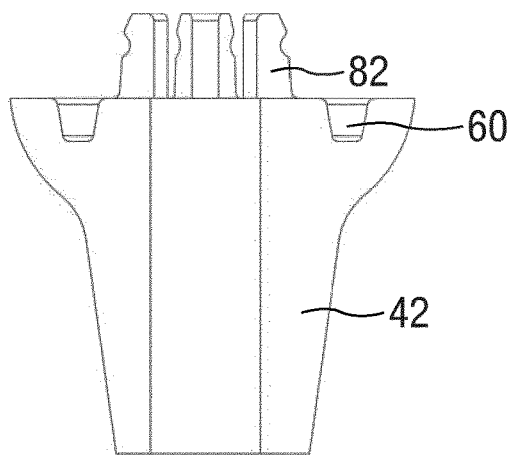
Figure 7G:
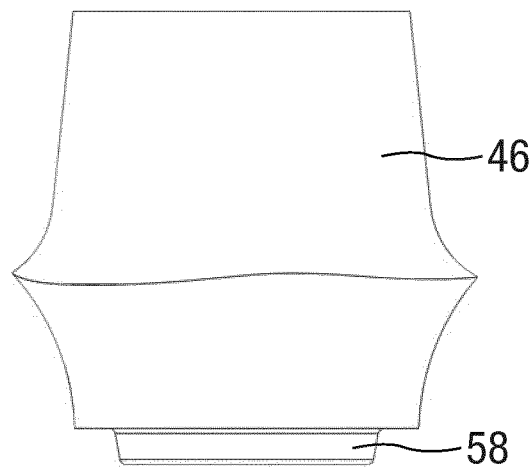
Figure 7H:
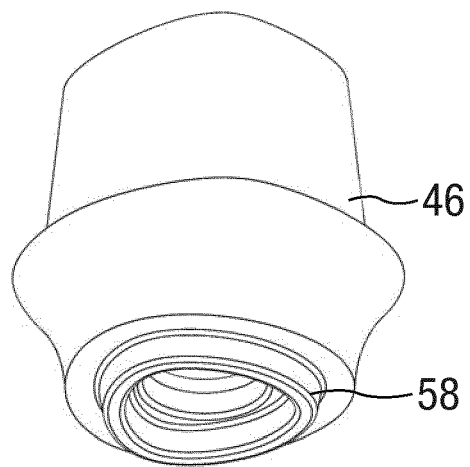
Figure 7I:
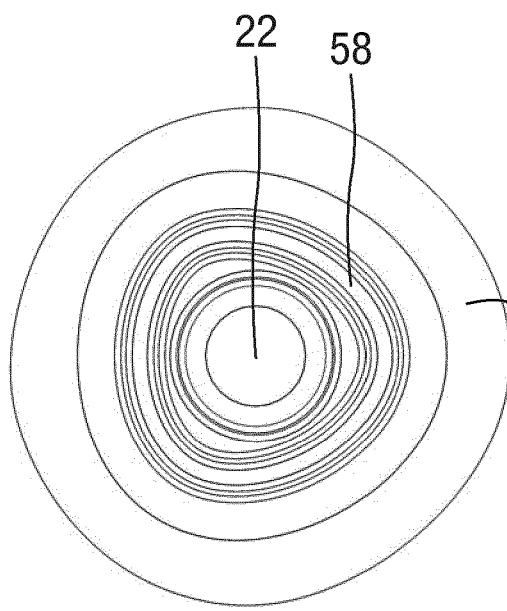
Figure 7J:
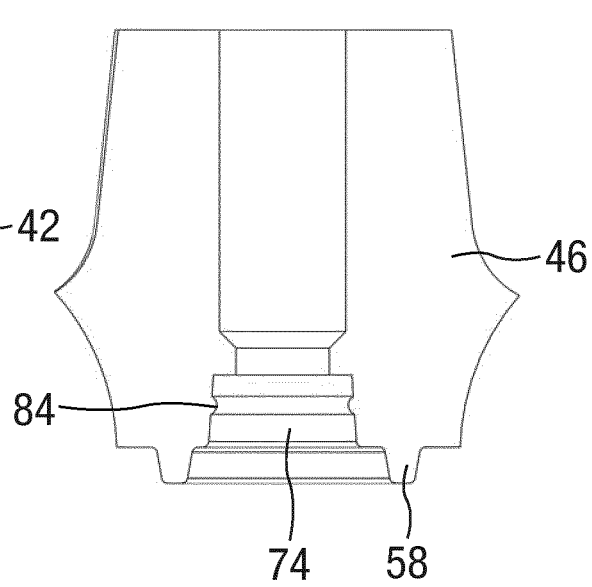
Figure 8A:
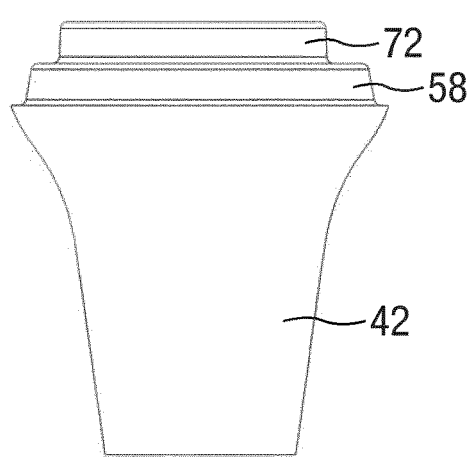
Figure 8B:
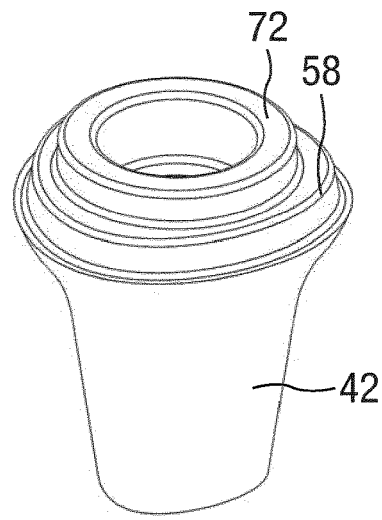
Figure 8C:
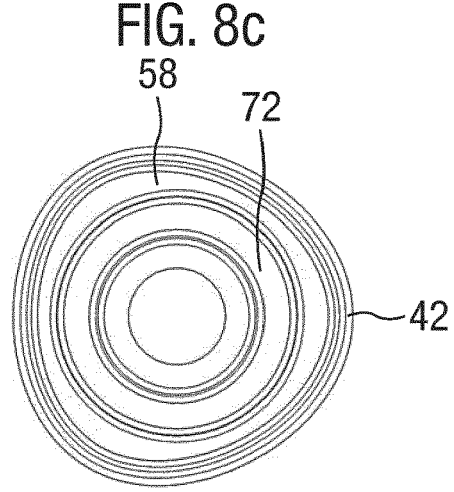
Figure 8D:
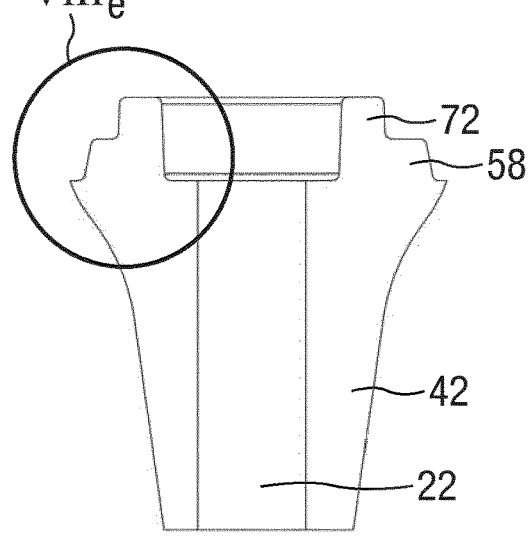
Figure 8E:
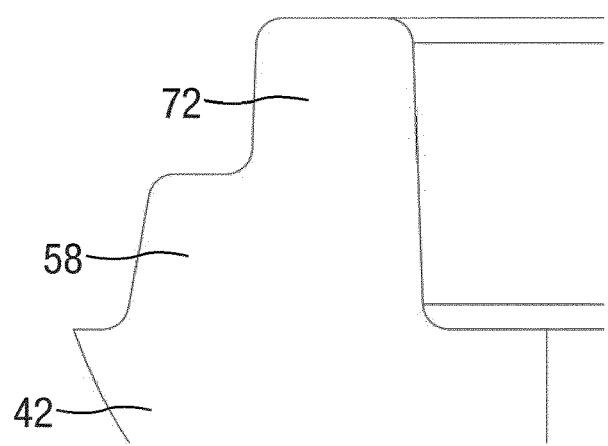

FIG. 5j is a longitudinal section of the support piece 46 of the prosthetic structure 34 of the dental prosthesis system 30 designed in such a manner. It can be see in this representation that the prosthetic structure 34 includes a central accommodating channel 22 for a connecting screw (not shown) with which the components can be fastened to each other. The cross-section of the accommodating channel 22 is widened in the area of its outlet opening 78 on the base face 54, so that an adjustment groove or adjustment recess 74 is formed, which on the inside merges into the accommodating channel 22.

In a further embodiment, considered as particularly advantageous, a system with several, in particular two, connecting screws, instead of a single connecting screw, can be provided. A first connecting screw can be intended for connecting the platform part 42 with the implant body 6, another connecting screw being provided for connecting the support piece 46 or the prosthetic structure 34 as a whole with the dental implant 32.

In an even further improved and, thus, preferred variant, as shown in FIG. 6, the adjustment guide pairing 70 is provided with a snap-in locking system 80. In detail, FIG. 6a is a side view of the components platform part 42 and support piece 46 connected with each other, FIG. 6b is a longitudinal section of the components platform part 42 and support piece 46 connected with each other, FIG. 6c is a side view of the platform part 42, FIG. 6d is a lateral top view of the platform part 42, FIG. 6e is a top view of the platform part 42, FIG. 6f is a longitudinal section of the platform part 42, FIG. 6g is a side view of the support piece 46, FIG. 6h is a lateral bottom view of the support piece 46, FIG. 6i is a bottom view of the support piece 46, FIG. 6j is a longitudinal section of the support piece 46, and FIG. 6k is an enlarged detail from FIG. 6f.

To provide the snap-in locking system 80, the adjustment collar 72 is in this variant of an open-worked design, so that it forms individual snap hooks 82 arranged peripherally one beside the other. Due to the openings, said snap hooks 82 may recede inwardly, i.e. in particular into the accommodating channel 22. The front ends of the snap hooks 82 are provided with snap-in locking grooves 84, as can be seen in particular in the enlarged detail of FIG. 6k. Corresponding thereto, a peripheral snap-in locking flute 86 is arranged in the accommodating channel 22 in the area of the recess 74 formed by the widening of the channel cross-section, so that the snap hooks 82, upon insertion of the now open-worked adjustment collar 72 into the recess 74, will first of all recede into the accommodating channel 22 and then their snap-in locking grooves 84 will snap into the snap-in locking flutes 86.

In an alternative embodiment, which is considered as independently inventive, the guide pairing 56 can also be suitably designed for forming the snap-in locking system 80. In such an embodiment, for example, the respective guide rib 58 can be of an open-worked design, so that it forms individual snap hooks 82. Corresponding thereto, the guide groove 60 can be designed with suitably positioned undercuts or the like, so that the snap hooks 82 can snap in during assembly of the components.

The exemplary embodiment of FIG. 7 shows a variant in which the guide rib 58 is formed integrally on the support piece 46 and the guide groove 60 is integrated in the platform part 60. FIG. 7a is a side view of the components platform part 42 and support piece 46 connected with each other, FIG. 7b is a longitudinal section of the components platform part 42 and support piece 46 connected with each other, FIG. 7c is a side view of the platform part 42, FIG. 7d is a lateral top view of the platform part 42, FIG. 7e is a top view of the platform part 42, FIG. 7f is a longitudinal section of the platform part 42, FIG. 7g is a side view of the support piece 46, FIG. 7h is a lateral bottom view of the support piece 46, FIG. 7i is a bottom view of the support piece 46, and FIG. 7j is a longitudinal section of the support piece 46.

In a further alternative embodiment, shown in FIG. 8, the adjustment collar 72 can also be mounted on the or one of the guide ribs 58, so that together they form a profile contour merging into each other. In FIG. 8, FIG. 8a is a side view of the platform part 42, FIG. 8b is a lateral top view of the platform part 42, FIG. 8c is a top view of the platform part 42, FIG. 8d is a longitudinal section of the platform part 42, and FIG. 8e is an enlarged detail from FIG. 8d. It is particularly clearly recognizable in the top view of FIG. 8c that the adjustment collar 72 has a round outer cross-section, thus allowing, after the lateral positioning has been found, a rotation of the components relative to each other, whereas the guide rib 58 has a trioval outer contour, thus forming an indexing.

Figure 9A:
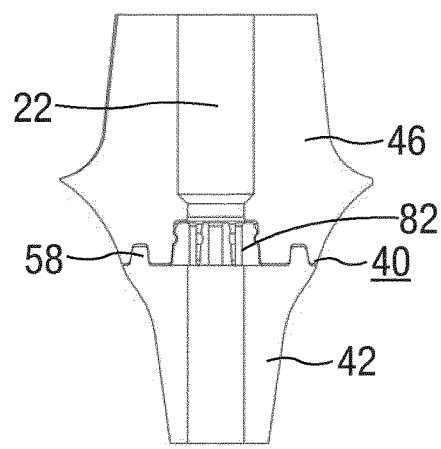
Figure 9B:
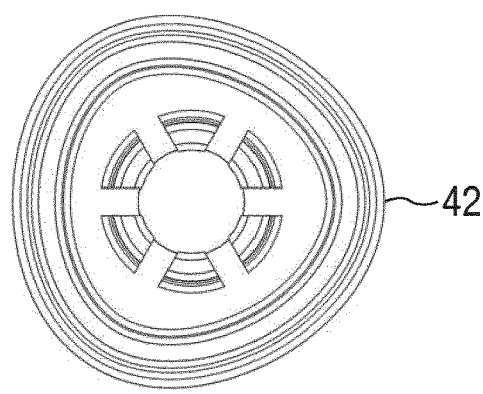
Figure 9C:
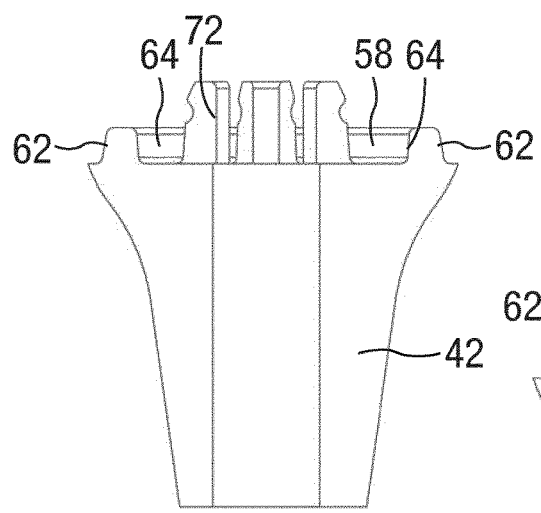
Figure 9D:
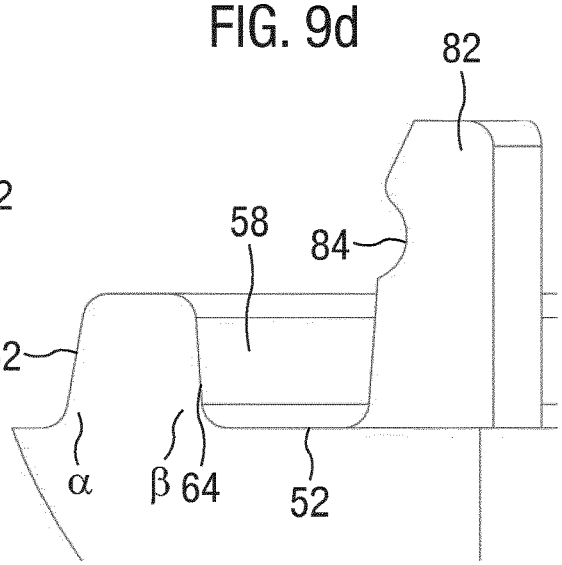
Figure 9E:
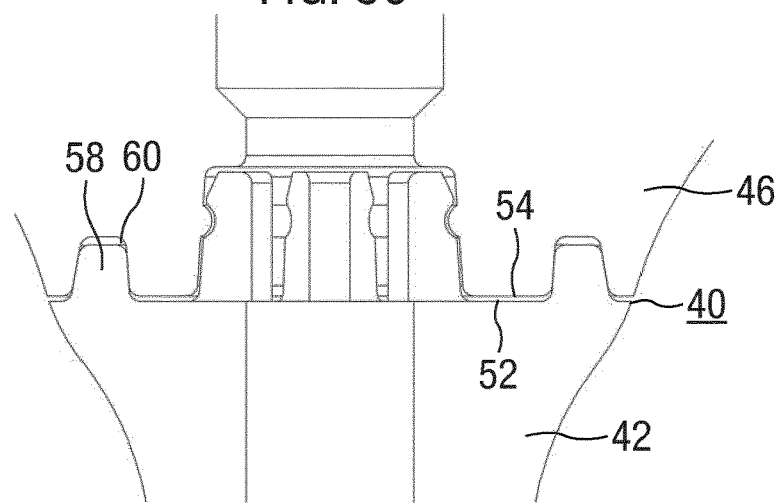
Figure 10A:
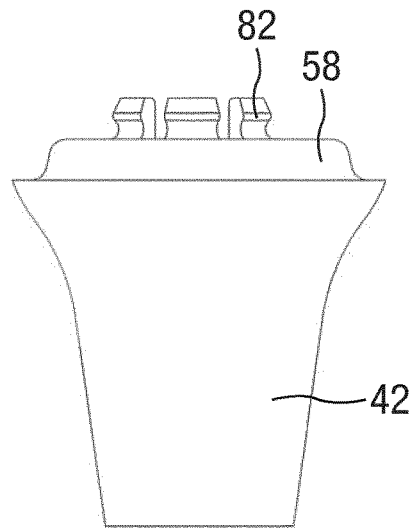
Figure 10B:
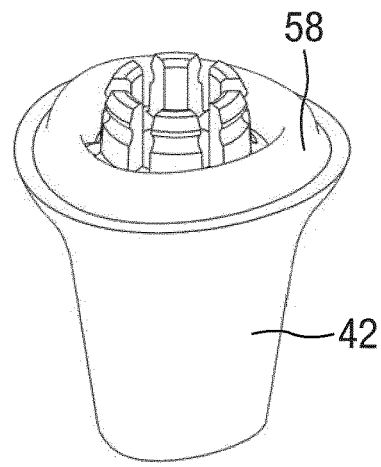
Figure 10C:
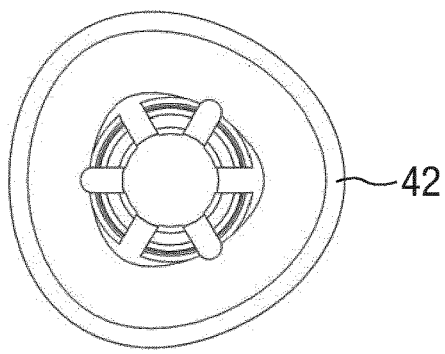
Figure 10D:
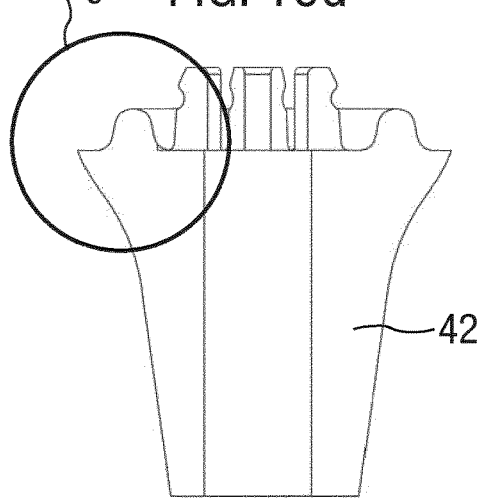
Figure 10E:
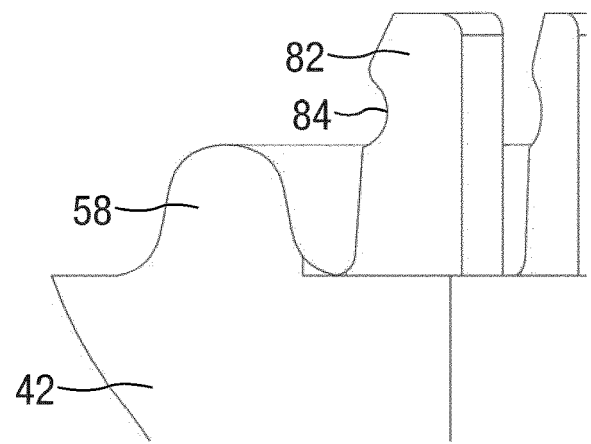

The profile of the guide rib(s) 58 and the respective associated guide groove(s) 60 is also of particular importance. It can be seen, for example, in the embodiment of FIG. 6k that the guide rib 58 has a rib profile with flanks 88, 90, which form with the plane of the bearing face 52 the flank angles $\alpha$ and $\beta$, respectively, and, viewed peripherally, form the outer lateral edge 62 and the inner lateral edge 64, respectively. Alternatively or additionally, the rib profile of the guide rib 58 can also be designed with one or both flank(s) 88, 90 being bulged flanks 88, 90. Both embodiments are particularly advantageous, by themselves as well as in combination with each other, in order to suitable compensate the expected different compressive and tractive forces due to the chewing load to be expected. In a preferred embodiment, shown in FIG. 9, the flank angles $\alpha$, $\beta$ are of different size, the flank angle $\alpha$ associated with the outer lateral edge 62 being smaller than the flank angle $\beta$ associated with the inner lateral edge 64, so that the inner lateral edge 64 stands "steeper" on the bearing face 52 than the outer lateral edge 62. This is shown in the exemplary embodiment of FIG. 9, in which, in detail, FIG. 9a is a longitudinal section of the components platform part 42 and support piece 46 connected with each other, FIG. 9b is a top view of the platform part 42, FIG. 9c is a longitudinal section of the platform part 42, FIG. 9d is an enlarged detail from FIG. 9c, and FIG. 9e is an enlarged detail from FIG. 9a.

In a further alternative embodiment, shown in FIG. 10, the guide rib 58 can also be provided, in the manner of a bead, with a curved profile of the lateral edges 62, 64. FIG. 10a is a side view of the platform part 42, FIG. 10b is a lateral top view of the platform part 42, FIG. 10c is a top view of the platform part 42, FIG. 10d is a longitudinal section of the platform part 42, and FIG. 10e is a detail from FIG. 10d. The curved contour of the profile of the guide rib 58 is clearly recognized.

Through the two-part design of the dental implant 32 in the before-mentioned exemplary embodiments, it is achieved, as an additional considerable advantage, that the implant body 6 is positioned, after its insertion, as a so-called "bone-level" implant, with its upper edge 92 in the area of the jaw bone, above which normally tissue is still present (see FIG. 2). If required, the wound can first of all be closed after insertion of the implant body 6, so that the healing-in process can take place in a relatively sparing and safe way, in the manner of a "closed" healing-in. This could be advantageous in particular when complications occur during insertion of the implant body 6, in particular with regard to the primary stability, so that such a closed healing-in is desirable. After the healing-in, the wound can be opened again and the platform part 42 can be mounted, so that after this assembly, the latter's upper edge 94 for forming the bearing face 52 is positioned, in the manner of a "tissue-level" implant, above the tissue level and is, thus, particularly well accessible. Therefore, the platform part 42 serves, among others, for transforming the original "bone-level" implant 6 into a "tissue-level" dental implant 32.

Figure 11A:
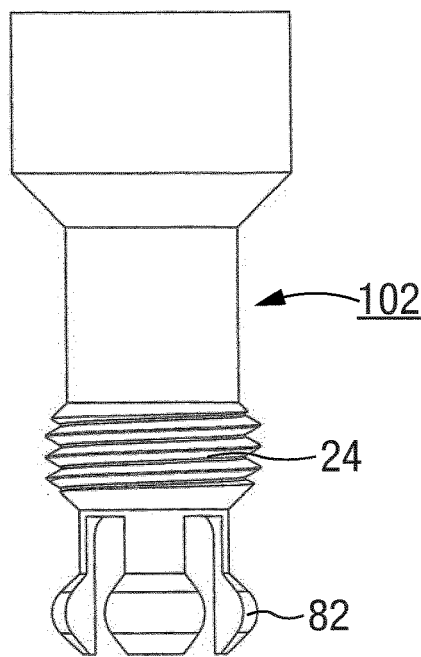
Figure 11B:
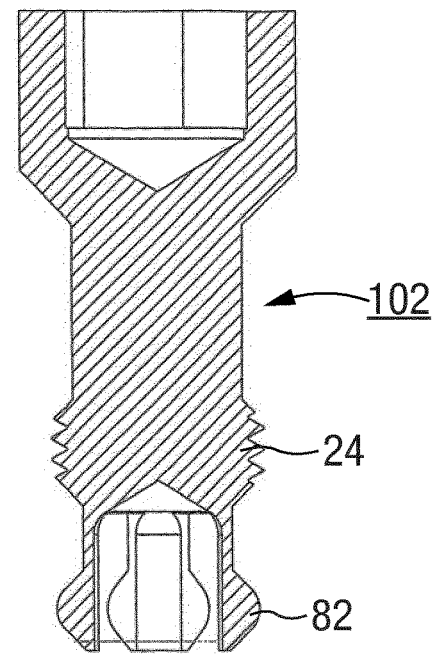

In an alternative embodiment, which is considered as independently inventive, a snap-in locking system 100 is provided by means of a modified connecting screw 102 and accordingly adapted corresponding components. In this embodiment, which is advantageous in particular for systems with small overall widths and volume reserves, the modified connecting screw 102 is designed on its end side, i.e. "below" the external thread 24, with a number of snap hooks 82. FIG. 11*a* is a side view and FIG. 11*b* is a longitudinal section of such a modified connecting screw 102. FIG. 12 shows the assembly process for this embodiment: in FIG. 12*a*, the components platform part 42, support piece 46 and connecting screw 102 are provided and suitably positioned relative to each other. It can also be seen in this representation that the cross-section of the accommodating channel 20 for the connecting screw 102 widens inwardly in the area of its free outlet 104. In this way, undercuts are formed in the area of the outlet opening, into which the snap hooks 82 can snap in.

Figure 12A:
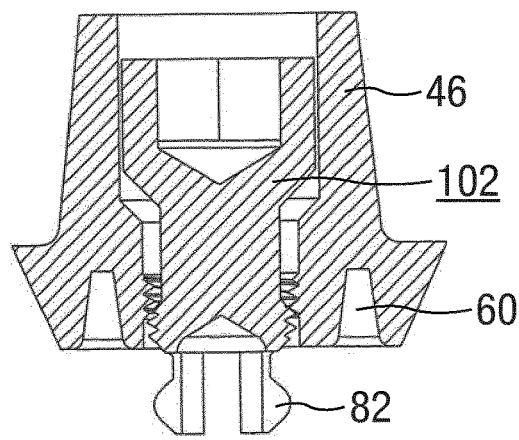
FIG. 12A to FIG. 12E show the pre-assembly of the components support piece, platform part and connecting screw in a sequence of assembly steps.
Figure 12A:
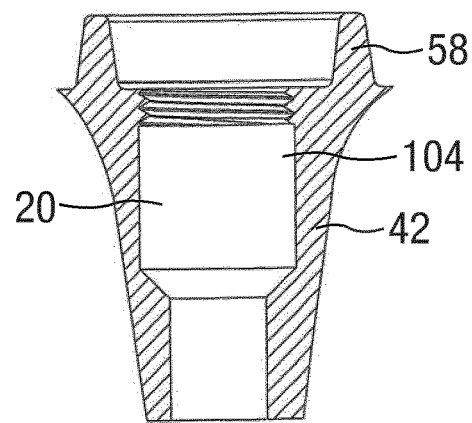
Figure 12B:
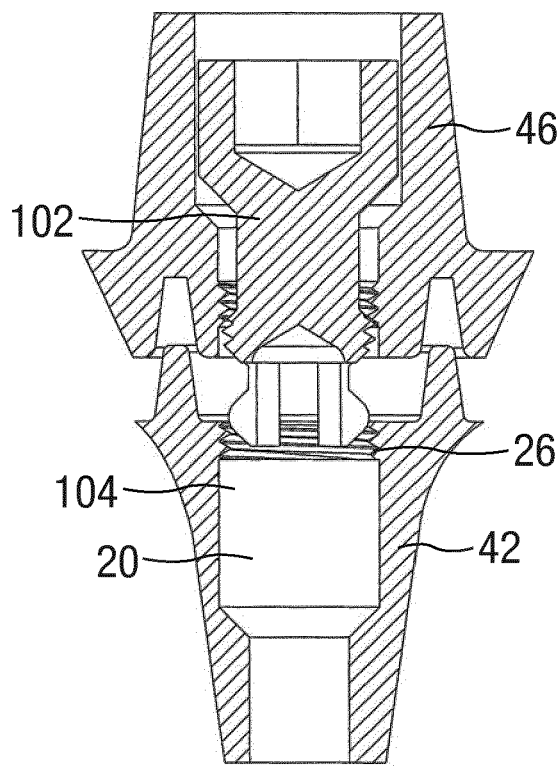
Figure 12C:
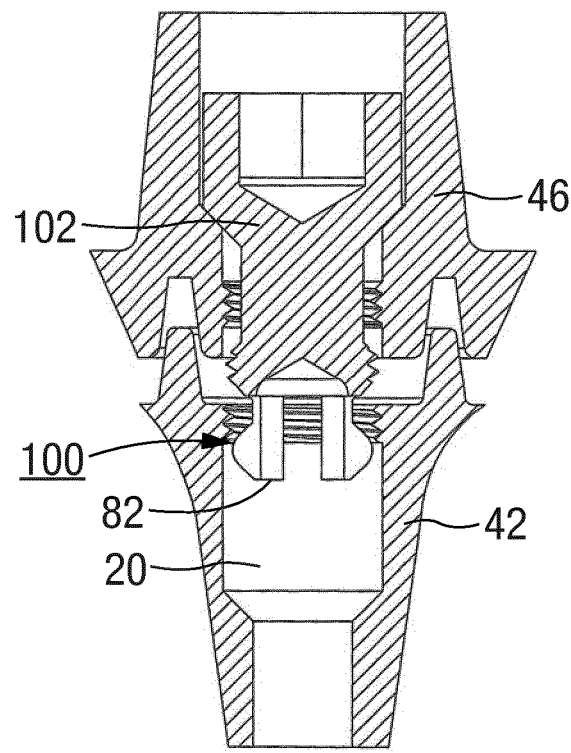
Figure 12D:
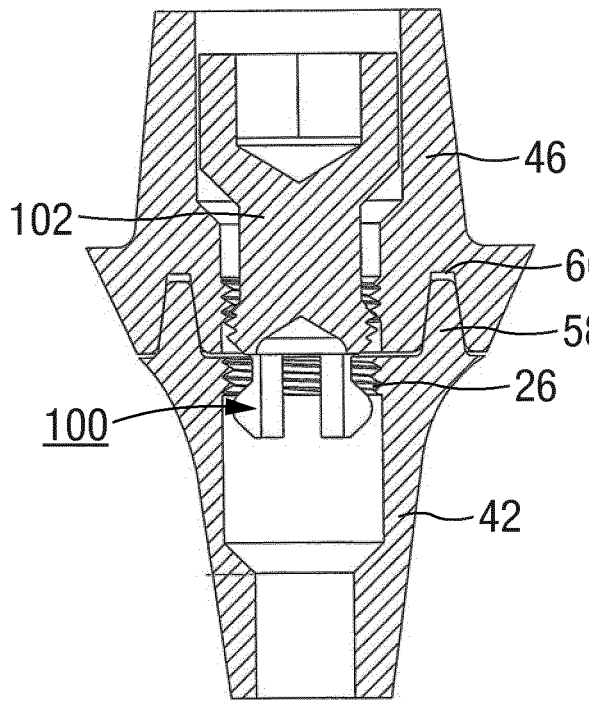
Figure 12E:
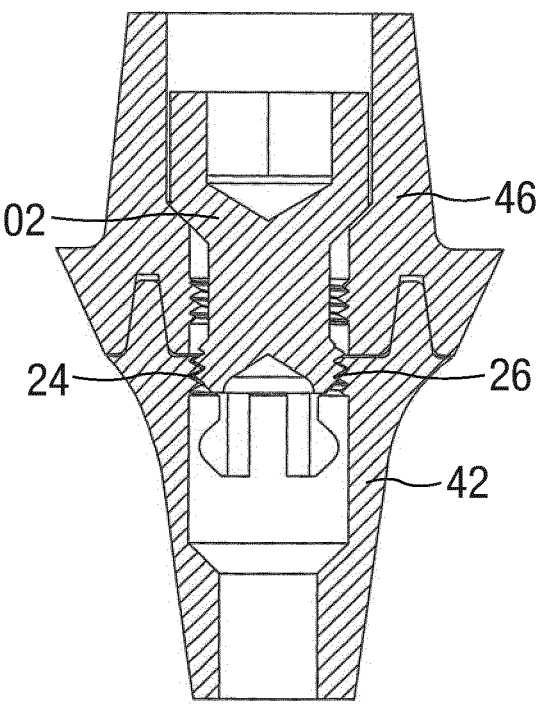

In the step shown in FIG. 12*b*, the components are suitably oriented relative to each other, so that it is possible to push the connecting screw 102 into the accommodating channel 20. Then, as shown in FIG. 12*c*, the connecting screw 102 is pushed into the accommodating channel 20, the snap hooks 82 being first of all pressed inwardly, springing outwardly again after having passed the free outlet opening of the accommodating channel and thus snapping into the undercuts formed there. In the following step, shown in FIG. 12*d*, finally, the support piece 46 is mounted completely on the platform part 42, the guide rib 58 engaging into the guide groove 60. In the final step, shown in FIG. 12*e*, the connecting screw 102 is tightened, its external thread 24 engaging into the corresponding internal thread 26 in the platform part 42, thus fixing the components relative to each other.

In this embodiment, the support piece 46 can additionally also be provided with an internal thread 26, into which the external thread 24 of the connecting screw 102 engages during the intermediate steps, thus provisionally fixing the screw.

Figure 13A:
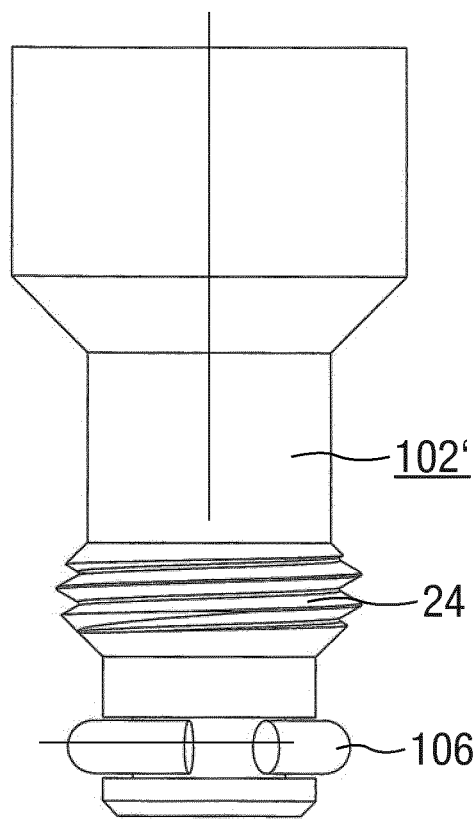
FIG. 13A and FIG. 13B show an alternative modified connecting screw.
Figure 13B:
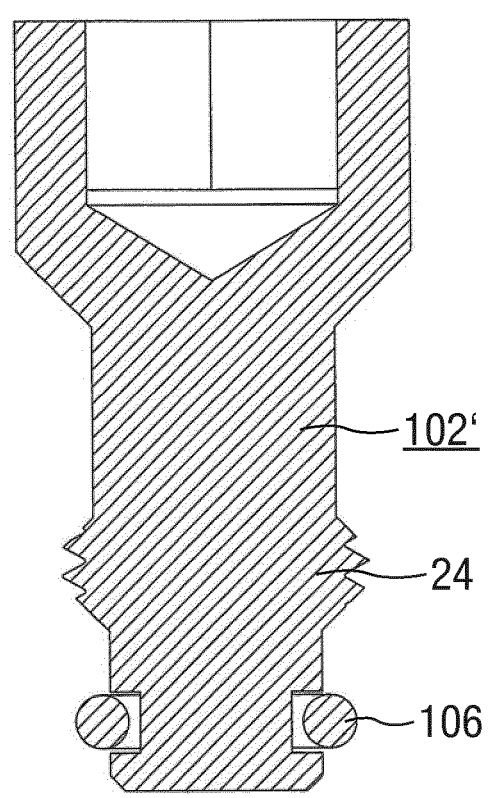

FIG. 13 shows an alternative embodiment of the modified connecting screw 102', namely in a side view (FIG. 13*a*) and in a longitudinal section (FIG. 13*b*). In this variant, a spring ring 106 or retaining ring is arranged on the end side of the screw barrel, for forming the snap-in locking system, which ring is deformed inwardly when the screw penetrates into the accommodating channel 20 and afterwards springs into the undercut.

LIST OF REFERENCE NUMBERS

1 Dental prosthesis system
2 Dental implant
4 Prosthetic structure
6 Implant body
8 External thread
10 Apical end
11 Cutting grooves
12 Abutment
14 Base body
16 Accommodating channel
18 Connecting pin
20 Accommodating channel
22 Connecting screw
24 External thread
26 Internal thread
28 Assembly pin
30 Dental prosthesis system
32 Dental implant
34 Prosthetic structure
40 Connection
42 Platform piece
44 Base body
46 Support piece
48 Prosthetic part
50 Front end
52 Bearing face
54 Base face
56 Guide pairing
58 Guide rib
60 Guide groove
62, 64 Lateral edge
70 Adjustment guide pairing
72 Adjustment collar
74 Adjustment recess
78 Outlet opening
80 Snap-in locking system
82 Snap hook
84 Snap-in locking groove
86 Snap-in locking flute
88, 90 Flank
92, 94 Upper edge
100 Snap-in locking system
102, 102' Modified connecting screw
104 Outlet
106 Spring ring

The invention claimed is:

1. A dental prosthesis system (30) comprising: a dental implant (32) and a prosthetic structure (34) mountable on the dental implant (32), wherein the dental implant (32) and the prosthetic structure (34) include a central accommodating channel (22) for a connecting screw, wherein the dental implant (32), for mounting the prosthetic structure (34), forms a bearing face (52) serving as a support face for the prosthetic structure (34), and the prosthetic structure (34) forms a base face (54) adapted in terms of its contour to the bearing face (52), and wherein the bearing face (52) and the base face (54) are provided with a number of guide pairings (56), wherein the guide pairings (56) comprise one or more guide ribs (58) formed integrally on the dental implant (32) or the prosthetic structure (34) and wherein a corresponding guide groove (60) is formed integrally into the respective other component (32 or 34), wherein the one or more guide ribs (58), being an annular bead with a peripheral, closed contour having an outer side edge (62) and an inner side edge (64); wherein the inner and outer side edges (62, 64) of the guide rib (58) have a contour adapted to one another, so that the guide rib (58) forms a circumferential band of approximately constant width in plane view, characterized in that the outer side edge (62) and the inner side edge (64) of the guide rib (58) are not aligned parallel to one another as seen in the profile of the guide rib (58), wherein the outer side edge and the inner side edge of the corresponding guide groove are not aligned parallel to one another as seen in the profile of the guide groove, and wherein the corresponding guide groove (60) associated with the guide rib is adapted in contouring with the guide rib so that it can be brought into a positive locking with the guide rib (58).

2. The dental prosthesis system (30) of claim 1, wherein the outer lateral edge (62) of the one or more guide ribs (58) is inclined against a plane normal to the longitudinal axis of the dental implant (32) by a flank angle ($\alpha$).

3. The dental prosthesis system (30) of claim 1, wherein at least one of the one or more guide ribs (58) has a rib profile with two different flank angles.

4. The dental prosthesis system (30) of claim 1, wherein the dental implant (32) is of a multi-part design and comprises an implant body (6) as well as a platform part (42) provided for producing a connection (40) with the prosthetic structure (34).

5. The dental prosthesis system (30) of claim 1, wherein the bearing face (52) and the base face (54) are provided with an adjustment guide pairing (70), which comprises an adjustment collar (72) which is formed integrally on one of the faces (52, 54), which is rotationally symmetrical to the longitudinal axis of the dental implant and which has a collar height larger than the largest height of the guide ribs (58), and a corresponding adjustment groove (74) formed integrally into the respective other face (52, 54).

6. The dental prosthesis system (30) of claim 5, wherein the adjustment collar (72) or the corresponding adjustment groove (74), respectively, being arranged peripherally immediately around a front-face outlet opening (78) of the accommodating channel (22).

7. The dental prosthesis system (30) of claim 5, wherein the adjustment guide pairing (70) is provided with a snap-in locking system (80).

8. The dental prosthesis system (30) of claim 1, wherein the connecting screw is dimensioned, taking into account the spatial dimensions of the dental implant (32) and the prosthetic structure, in such a way that a screw thread of the connecting screw will engage into a corresponding internal thread arranged in the dental implant (32) only after the one or more guide ribs (58) has engaged into the corresponding guide groove (60).

9. The dental prosthesis system (30) of claim 1, wherein the prosthetic structure (34) is of a multi-part design and comprises a support piece (46) provided for producing a connection (40) with the dental implant (32) and a prosthetic part (48) arranged on said support piece (46) and forming the dental prosthesis system.

10. The dental prosthesis system (30) of claim 1, wherein the dental implant comprises a non-round cross-sectional contour, wherein the non-round cross-sectional contour is trioval.

11. The dental prosthesis system (30) of claim 1, wherein the outer lateral edge (62) of the one or more guide ribs (58) is of a conical design.

12. The dental prosthesis system (30) of claim 1, wherein the outer side edge (62) of the guide rib (58) is inclined by a flank angle ($\alpha$) with respect to a plane perpendicular to the longitudinal axis of the dental implant (32), and wherein the inner side edge (64) of the guide rib (58) is inclined by a flank angle ($\beta$) with respect to this plane.

* * * * *